US009479507B2

(12) United States Patent
Aronson

(10) Patent No.: US 9,479,507 B2
(45) Date of Patent: *Oct. 25, 2016

(54) SINGLE-POINT-OF-ACCESS CYBER SYSTEM

(71) Applicant: Jeffry David Aronson, San Antonio, TX (US)

(72) Inventor: Jeffry David Aronson, San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/447,283

(22) Filed: Jul. 30, 2014

(65) Prior Publication Data

US 2015/0012972 A1    Jan. 8, 2015

Related U.S. Application Data

(63) Continuation of application No. 13/702,537, filed as application No. PCT/US2011/056931 on Oct. 19, 2011, now Pat. No. 8,832,794, which is a continuation-in-part of application No. 12/908,162, filed on Oct. 20, 2010, now abandoned.

(51) Int. Cl.
| | |
|---|---|
| *H04L 12/24* | (2006.01) |
| *H04L 29/06* | (2006.01) |
| *G06F 21/62* | (2013.01) |
| *G06F 21/60* | (2013.01) |
| *G06F 1/16* | (2006.01) |

(52) U.S. Cl.
CPC .............. *H04L 63/10* (2013.01); *G06F 21/60* (2013.01); *G06F 21/6218* (2013.01); *G06F 21/6263* (2013.01); *H04L 41/50* (2013.01); *H04L 63/0876* (2013.01); *H04L 63/102* (2013.01); *H04L 63/20* (2013.01); *G06F 1/162* (2013.01); *G06F 1/1622* (2013.01); *G06F 1/1641* (2013.01); *G06F 2221/2101* (2013.01); *G06F 2221/2149* (2013.01)

(58) Field of Classification Search
CPC ... H04L 12/2816; H04L 63/10; H04L 63/20; G06F 21/60
USPC .............................................. 726/3; 709/225
See application file for complete search history.

(56) References Cited

U.S. PATENT DOCUMENTS

| | | |
|---|---|---|
| 2005/0288961 A1 | 12/2005 | Tabrizi |
| 2007/0031807 A1 | 2/2007 | Kim |

(Continued)

FOREIGN PATENT DOCUMENTS

| | | |
|---|---|---|
| JP | 2001-273257 | 10/2001 |
| KR | 10-2001-0096755 | 11/2001 |
| WO | 2004-046852 A2 | 6/2004 |

OTHER PUBLICATIONS

International Search Report regarding corresponding PCT Application No. PCT/US2011/056931, dated May 22, 2012.

*Primary Examiner* — Haresh N Patel
(74) *Attorney, Agent, or Firm* — John A. Fortkort; Fortkort & Houston PC

(57) ABSTRACT

The system and system components of the present disclosure provide individuals with both a safe and a secure cyber environment. Within this safe and secure cyber environment each individual and each cyber device is properly identified for all cyber interactions with others and for all cyber interactions with the cyber devices of others. The system also provides individuals with privacy for the individual's cyber activities and cyber assets. Further, the system provides for environment-wide interoperable use of any cyber device, cyber programming, and cyber content.

31 Claims, 18 Drawing Sheets

(56) References Cited

U.S. PATENT DOCUMENTS

| | | |
|---|---|---|
| 2008/0046719 A1 | 2/2008 | Kim et al. |
| 2009/0307660 A1 | 12/2009 | Srinivasan |
| 2010/0202450 A1* | 8/2010 | Ansari ............... G06Q 30/04 370/389 |
| 2010/0280635 A1* | 11/2010 | Cohn ............... G08B 25/001 700/90 |
| 2011/0125925 A1* | 5/2011 | Bouthemy ......... H04L 12/2834 709/250 |
| 2011/0126275 A1* | 5/2011 | Anderson ............ H04L 9/3213 726/8 |
| 2012/0011077 A1 | 1/2012 | Bhagat |
| 2013/0177878 A1 | 7/2013 | Rodriguez et al. |
| 2013/0232576 A1 | 9/2013 | Karnikis et al. |
| 2013/0298219 A1 | 11/2013 | Byrkit et al. |

* cited by examiner

SINGLE-POINT-OF-ACCESS CYBER SYSTEM

CROSS-REFERENCE TO RELATED APPLICATIONS

This application is a continuation of U.S. patent application Ser. No. 13/702,537, filed Mar. 4, 2013, having the same title, and the same inventor, issued Sep. 9, 2014 as U.S. Pat. No. 8,832,794, and which is incorporated herein by reference in its entirety; which application is a 371 of PCT/US2011/056931, filed Oct. 19, 2011, having the same title, and the same inventor, and which is incorporated herein by reference in its entirety; and said PCT/US2011/056931 is a continuation-in-part application which claims the benefit of priority from U.S. application Ser. No. 12/908,162, filed Oct. 20, 2010, having the same title, and the same inventor, now abandoned, and which is incorporated herein by reference in its entirety.

BACKGROUND

1. Field of the Invention

This embodiment pertains to a system, system components, and methods which together provide for cyber interactions among individuals and cyber devices; more particularly, the present embodiment pertains to a system, system components, and methods which together provide a cyber environment which provides individuals with safe, secure, private cyber interactions with properly identified others, and safe, secure, private cyber interactions with the properly identified cyber devices of others. In addition, the present embodiment provides individuals with the ability to selectively grant or deny others or the cyber devices of others access to all or any part of the individual's cyber activities, cyber interactions, and cyber assets. Further, the cyber environment which is provided by the present embodiment provides for interoperable use of cyber devices, cyber content, and cyber programming throughout the cyber environment. For the purpose of this Application, the term "cyber" shall generally be understood to refer to the use of non-biological processing of programming for any purpose. Further definition involving the use of the term follows.

2. Description of the Related Art

Individuals who access cyber environments have little or no assurance or expectations that the cyber environments will provide the individuals with security, privacy, or the ability to accurately grant or deny others or the cyber devices of others access to all or any part of the individuals' cyber activities, cyber interactions, or cyber assets. In addition current cyber environments cannot provide individuals with the identity of others or the identity of the cyber devices of others with whom, through use of the cyber environments, the individuals interact. Further, cyber environments do not provide for cyber environment-wide interoperable use of any cyber device, cyber programming, and cyber content.

There remains a need for a combination of system programming and system devices which provides a safe and secure cyber environment that provides each individual with both privacy for the individual's cyber activities as well as accurate and reliable control over others' access to the individual's cyber activities, cyber interactions, and cyber assets. In addition, the need remains for a combination of system programming and system devices which properly identifies each cyber device and each individual who uses the system. Further, the need remains for a combination of system programming and system devices which provides cyber environment-wide interoperable use of any cyber device, cyber programming, and cyber content.

SUMMARY

The present embodiment includes a combination of processes, procedures, programming, system architecture, device architecture, and devices which together provide individuals with both a safe and a secure cyber environment. Within this safe and secure cyber environment each individual and each cyber device will be properly identified for all cyber interactions with others and for all cyber interactions with the cyber devices of others. The present embodiment also provides individuals with any level of privacy that is required by each individual for the individual's cyber activities and cyber assets. The safe and secure cyber environment of the present embodiment further provides for environment-wide interoperable use of any cyber device, cyber programming, or cyber content which can be either configured to be used with the single-point-of-access cyber system or could be converted for use by processes and procedures which are a part of the single-point-of-access cyber system.

BRIEF DESCRIPTION OF THE DRAWINGS

A better knowledge of the system, the components of the system, and the methods of the present embodiment may be learned by referring to the drawing figures which illustrate essential architecture, components, and functions of the embodiment as described in the following Description of the Embodiments section.

DESCRIPTION OF EMBODIMENTS

Figure 1:
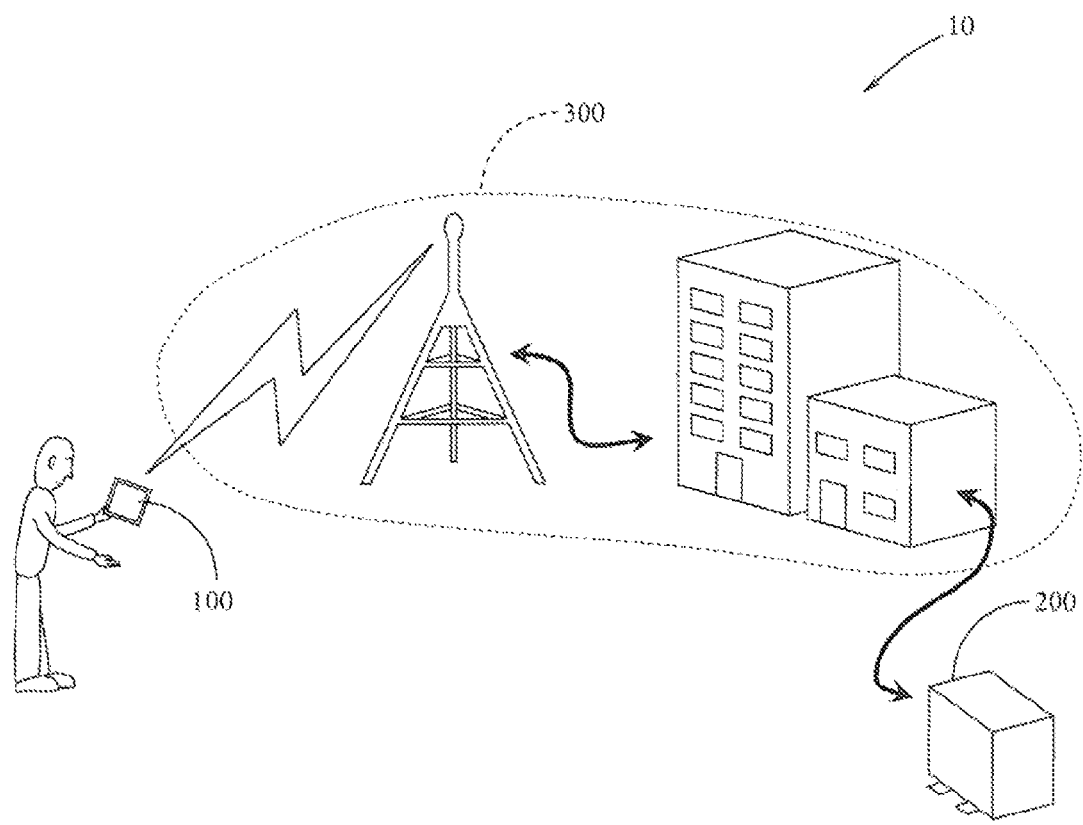
FIG. 1 is an overview diagram of the disclosed single-point-of-access cyber system.

The following Description of Embodiments is organized as follows:

1. Key definitions
2. General definitions
3. Advantages
4. Short overview
5. Expanded overview
6. Single-point-of-access cyber system architecture
7. Universal interactive operating system
8. Cyber communications network
9. Input output device
10. Cyber communications network between an input output device and a point of cyber access computer
11. Point of cyber access computer
12. Cyber telephone system
13. Cyber communications network between a sender's point of cyber access computer and a recipient's point of cyber access computer
14. An individual's cyber asset manager and the individual's device-based cyber assets
15. Cyber communications network between an individual's cyber asset manager and the individual's remote device-based cyber assets
16. Examples of use of the single-point-of-access cyber system (1) Key Definitions The meanings and definitions for the following list of key words and key phrases shall be used when key words and phrases from this list are used throughout this patent application.

Cyber: any activity, device, system, process, procedure, or file which uses non-biological processing for any purpose.

Cyber activities: use of any component or resource of the single point of access cyber system by an individual, or by a cyber device.

Private cyber activities: an individual's use of any component or resource of the single-point-of-access cyber system wherein all others and the cyber devices of all others are excluded from access to the individual's cyber activities.

Public cyber activities: an individual's use of any component or resource of the single-point-of-access cyber system which includes others or the cyber devices of others as a part of the individual's cyber activities.

Cyber assets: an individual's cyber devices and/or cyber files.

Device-based cyber assets: an individual's cyber devices.

File-based cyber assets: an individual's cyber files.

Cyber content: cyber files which, after processing, can be perceived by an individual through the individual's use of an input output device.

Cyber device: a physical or virtual device which directly or indirectly uses non-biological processing to achieve any purpose or function.

Cyber resources: the cyber files and cyber devices of others. Others may make copies of their file-based cyber assets available to an individual by providing the individual with a copy of the others' file-based cyber asset. The copy of the other's file-based cyber asset which is made available to the individual is considered to be a cyber resource of the individual.

The device-based cyber assets of others are also considered to be device-based cyber resources when they are shared with another individual.

Individual: any one person, or any entity that uses the single-point-of-access cyber system.

Entity: any business, government, school, organization, or other group of one or more individuals that has its own single-point-of-access cyber system identification.

Identity: the single-point-of-access cyber system requires that each individual who uses the single-point-of-access cyber system, and that each cyber device that is a part of the single-point-of-access cyber system, have one and only one single-point-of-access cyber system identification. An individual's single-point-of-access cyber system identification or a cyber device's single-point-of-access cyber system identification can also be considered to be the individual's single-point-of-access cyber system identity or the cyber device's single-point-of-access cyber system identity.

Established identity: the first step in the single-point-of-access cyber system identification process is when the identity of an individual or the identity of a cyber device is first established by a cyber device.

Verified identity: the cyber device which establishes the identity of an individual or a cyber device will then provide verification of the identity of the individual or the cyber device for all further cyber interactions of the individual or the cyber device.

Confirmed identity: a cyber device which receives verification of the identity of an individual or of a cyber device can then confirm the verified identity of the individual or the cyber device.

Properly identified: an individual or a cyber device whose identity has successfully been established, verified, and/or confirmed as required by single-point-of-access cyber system processes, procedures, and protocols.

Programming: computer programs or applications or any usable part thereof which serve any purpose.

(2) General Definitions

The meanings and definitions for the following list of words and phrases shall be used when words and phrases from this list are used throughout this patent application.

Operational access: access to a cyber device for the purpose of operating the cyber device.

Administrative access: access to a cyber device for the purpose of interacting with the administrative functions of the cyber device.

Cyber access: access (in any form) to any cyber device or any cyber activity.

Cyber address: the single-point-of-access cyber system unique locational address information or data for a cyber device.

Cyber identification: the single-point-of-access cyber system unique identification information or data for an individual or a cyber device.

Computer: a physical or virtual device that may use a processor, memory, storage, user interface, and an interconnection structure to process, access, store, modify, run, use, share, delete, or copy cyber files, code, and/or data.

Point of cyber access computer: a single-point-of-access cyber system computer which further includes a separate and distinct private computer as well as a separate and distinct public computer.

Private computer: a single-point-of-access cyber system computer which is a part of an individual's point of cyber access computer. A private computer can only be accessed by the individual and can only be accessed through the individual's point of cyber access computer.

Public computer: a single-point-of-access cyber system computer which is a part of an individual's point of cyber access computer. A public computer can be accessed by specified others and can only be accessed through the individual's point of cyber access computer.

Cyber communication: use of single-point-of-access cyber system telephone or video telephone service, or use of single-point-of-access cyber system mail or message service.

Cyber communications network: the single-point-of-access cyber system communications network (communication nodes and paths) which is used for interconnected transfer of cyber interactions between cyber devices.

Cyber files: one or more files that require non-biological processing within, and/or one or more files for use by a cyber device.

Cyber interaction: a cyber exchange which is sent from a cyber device and is received by a separate and different cyber device.

Cyber System: any physical or virtual system that uses non-biological processing to achieve any purpose or function.

Cyber telephone device: an input output device which is configured to send or receive cyber telephone communication interactions.

Cyber vault: a cyber environment where the individual can exclude cyber vault access to the cyber interactions of all others and to the cyber interactions of the cyber devices of all others. Cyber files and cyber devices including computers may be contained within a cyber vault. An individual's private computer can be considered to form the physical construct of the individual's cyber vault.

Cyber site: the single-point-of-access cyber system equivalent of a prior art internet web site.

Device: a mechanical or a cyber device or a combination thereof. Any cyber device may be a virtual device or a physical device, or a combination thereof.

Frames and scrolls format: a formal for creating and using interactive image-based cyber content which uses the pixel resolution grid from a frame formatted image or a scroll formatted image to identify the location of an individual's interaction with that specific image.

Frame: a cyber image with a pixel resolution grid size that does not exceed the size of both the height and the width of the pixel resolution grid of the cyber image output device where the image will be displayed.

Scroll: a cyber image with a pixel resolution grid height and/or width size which is larger than the corresponding height or width size of one or both of the dimensions of the pixel resolution grid of the cyber image output device where the image will be displayed.

Input output device: a cyber input device or a cyber output device or a cyber input and output device.

Thin device: a thin device provides limited processing functions, and, may provide only the minimum amount of processing functions that are needed for the operation of the thin device alone. A thin device thereby relies on a separate device to send interactions that are ready for use by the thin device.

Pre-processed cyber interaction: a cyber interaction whose content is in a state where it can be used by a thin device.

System: more than one process, procedure, or device which are configured together to perform or provide one or more functions.

Manage: store, access, use, modify, make available to others, copy, remove, delete, move, name, or rename a cyber file.

Others: any individuals who are not "the individual", "an individual", or "said individual".

User: an individual who uses the single-point-of-access cyber system.

(3) Advantages

Prior art cyber systems have many significant problems. The most significant of these problems is that the prior art systems cannot provide adequate and reasonable levels of safety, security, and privacy.

To that point, it is important to recognize that prior art cyber systems are not capable of accurately and reliably identifying one single person while that person is using cyber assets or resources. This, in turn, leads to the prior art system's inability to accurately and reliably hold any individual accountable for that individual's own cyber activities.

Further, if an individual's cyber assets are unable to accurately and reliably identify the individual as always being one, and only one, specific and unique individual, then the individual's cyber assets are also unable to accurately and reliably keep others from gaining access to the individual's personal and private cyber assets.

The single-point-of-access cyber system of the present embodiment, through use of its processes, procedures, architecture, programming, and devices, incorporates the system-wide use of accurate and reliable identity as a tool to provide each and every individual with not only extremely high levels of safety, security, and privacy while using cyber assets or resources of any kind, but also with absolute safety, security, and privacy for each individual's own personal and private cyber activities and cyber assets.

The use of accurate and reliable identity alone will not provide the highest attainable levels of cyber safety, security, and privacy.

The prior art system's unbelievably complex environment also contributes greatly to its inability to provide each individual with adequate and reasonable levels of cyber safety, security, and privacy.

The single-point-of-access cyber system of the present embodiment uses a best performing blend of: as simple as possible; as concise as possible; and, as efficient as possible; as a strategy that is applied to all aspects of the cyber system.

Use of simple, concise, and efficient as an environment-wide strategy enables the single-point-of-access cyber system of the present embodiment to achieve the highest levels of cyber safety, security, and privacy that may be obtained. Through use of the single-point-of-access cyber system, the unbelievably complex environment that has always plagued prior art cyber systems can be eliminated.

One example of the single-point-of-access cyber system's use of as simple, as concise, and as efficient as possible, is its architecture that integrates all cyber activities, all cyber assets, and all cyber resources into the operation of one single computer. This computer may provide for: phone; television; computing; remote device integration; personal health devices; etc.; to all operate as a part of one system that uses one as simple, as concise, and as efficient as possible universal interactive operating system.

Perhaps the greatest benefit any individual may gain from his or her use of cyber assets is the benefit that can be derived by first collecting, and then using, the individual's own personal and private data. This cyber function can, among many other things, provide the individual with technology-based augmentation to the individual's natural cognitive and perceptive capabilities. An individual's use of cyber augmentation to the individual's natural cognitive and perceptive capabilities is similar in concept to an individual's use of an automobile to augment the individual's own natural ability to move from one location to another.

Further, each individual may also derive benefit from use of his or her own body of collected data when the individual's cyber assets use the data to predict, and be prepared to provide for, whatever cyber assets or cyber resources the individual may want or need now and in the future.

The single-point-of-access cyber system of the present embodiment provides for each individual to have absolute safety, security, and privacy for all of his or her own personal and private computing activities and assets. It is essential and of utmost importance that no others ever gain access to the personal and private cyber activities and assets of an individual.

The following six steps embodied in this single-point-of-access cyber system solve the majority of the problems of prior art cyber systems. In addition, the method steps which are embodied in the disclosed single-point-of-access cyber system also solve many of the existing problems with the prior art cyber environment.

a. Each cyber device and each individual who uses the disclosed single-point-of-access cyber system and method will be required to be properly identified.

b. Each individual who uses the disclosed single-point-of-access cyber system and method will be identified by the individual's remotely accessible point of cyber access computer.

c. Each individual who uses the disclosed single-point-of-access cyber system and method may gain access to the single-point-of-access cyber system through the individual's remotely accessible point of cyber access computer.

d. The remotely accessible point of cyber access computer of each individual provides and includes a separate and different computer for the processing and support of the individual's private cyber activities as well as another separate and different computer for the processing and support of the individual's public cyber activities.

e. Each individual has exclusive access to the part of the individual's own point of cyber access computer which provides processing and support for the individual's private cyber activities.

f. The disclosed single-point-of-access cyber system provides for cyber content and cyber devices which do not use the single-point-of-access cyber system's operating system to operate seamlessly when being used as a part of the disclosed single-point-of-access cyber system.

(4) Short Overview

A simplified graphic representation of the disclosed single-point-of-access cyber system appears in FIG. 1, wherein an individual is shown using an input output device. By use of the input output device, a cyber interaction from the properly identified individual gains access to, and is transferred through, the cyber communications network, and to the individual's point of cyber access computer where the individual's identity is properly established prior to the individual's cyber interaction gaining access to the individual's point of cyber access computer. After having gained access to his or her own point of cyber access computer, the individual, through the individual's cyber interactions, may engage in both private and public cyber activities. Private cyber activities are for the individual only. Public cyber activities involve others. By use of the disclosed system, the individual has complete access control over cyber interactions from others. The interoperability provided by the disclosed system enables the integration of interactions with any type of cyber devices into the disclosed system.

The disclosed single-point-of-access cyber system requires that each individual be properly identified prior to each step that the individual's cyber interactions carries out through the single-point-of-access cyber system. The disclosed single-point-of-access cyber system further requires that each cyber device be properly identified prior to each step the cyber device's cyber interactions carries out through the single-point-of-access cyber system. These identification requirements for the individual and for the cyber devices provide a safe, secure cyber environment for all who use the single-point-of-access cyber system. These identification requirements for all individuals and for all cyber devices are also necessary to enable the disclosed single-point-of-access cyber system to provide every individual with the ability to have a full range of cyber personal rights as well as a full range of cyber property rights.

The disclosed single-point-of-access cyber system provides a portal where an individual gains access to cyber interactions, to cyber communications, to the individual's cyber assets, and to cyber resources. By providing an individual with a single portal for access to cyber interactions, to cyber communications, to cyber activities, to the individual's cyber assets, and to cyber resources, the individual is provided with enormous advantages over prior art cyber systems and prior art communications systems.

The disclosed single-point-of-access cyber system and method provides a standard set of cyber processes and cyber procedures for interconnected cyber interactions with remote cyber devices. This feature of the single-point-of-access cyber system provides any device or any cyber device with the ability to be easily configured to be used as an integral part of the single-point-of-access cyber system.

The architecture, devices, processes, and procedures of the single-point-of-access cyber system provide a private, safe, secure cyber environment for use by an individual. A private, safe, secure cyber environment for an individual's cyber activities must be provided before cyber personal rights, cyber property rights, and cyber privacy rights can be provided.

As compared to prior art cyber systems, where most computer programs use their own unique processes, procedures, and programming, the disclosed single-point-of-access cyber system of the present embodiment provides computer programs with standard processes, procedures, and programming. This system-wide use of standard processes, procedures, and programming provides enormous advantages for cyber system security, cyber system safety, cyber system interoperability, cyber system interconnectivity, and overall cyber system simplicity.

Through an individual's exclusive use of the individual's private computer which is within the individual's point of cyber access computer, the disclosed single-point-of-access cyber system provides the individual with the ability to safely, securely, and privately store, access, modify, use, and manage the individual's cyber-based information and the individual's file-based cyber assets. This use of the individual's private computer creates a cyber environment where cyber-based information and file-based cyber assets attain long-term value which is similar to that of their physical counterparts.

The disclosed single-point-of-access cyber system provides an individual with the ability to selectively, safely, securely, and privately share all, or any part of, the individual's cyber-based information or file-based cyber assets with selected others. This feature of the single-point-of-access cyber system provides an individual with the ability to have full control over access by others to all, or any part of, the individual's cyber-based information or file-based cyber assets.

The requirement of the single-point-of-access cyber system for cyber interactions be sent to a recipient as pre-processed content drastically reduces the recipient's need for processing resources as well as the cyber communications network's need for the cyber resources to transfer interconnected cyber activities and cyber interactions.

The disclosed single-point-of-access cyber system's use of pre-processed image-based cyber interactions eliminates the risk of receiving malicious content in a cyber file that would need to be processed into image-based content by the recipient.

The disclosed single-point-of-access cyber system may include a thin input output device for an individual's use. The thin input output device provides the individual with the ability to gain safe and secure remote access to the individual's point of cyber access computer. After having been properly identified, the individual may gain access to the individual's cyber resources such as the individual's cyber telephone system, cyber interactions with others, and cyber interactions with the individual's cyber assets and cyber resources. The thin input output device provides the individual with interconnected cyber interactions with the individual's remote point of cyber access computer.

The thin input output device facilitates maximum utility and mobility for the individual's use of the single-point-of-access cyber system because the thin input output device provides the individual with the ability to gain safe, secure, and private access to the individual's point of cyber access computer from any location. Further, the thin input output device requires a minimum amount of cyber resources at the physical location of the individual.

The disclosed single-point-of-access cyber system provides for a complete and full-featured, yet less complex, cyber system. This alters the need found in prior art systems for more computer processing capabilities for use with future cyber system enhancements and improvements. Use of the disclosed single-point-of-access cyber system will eliminate the need for development of bigger, better, faster, and more capable cyber processors. Encryption is the backbone of prior art cyber security. However, bigger, better, faster, more capable cyber processors could eventually have capabilities to regularly decipher encrypted cyber files, thereby overcoming encryption-based prior art cyber security and cyber privacy measures.

The disclosed single-point-of-access cyber system's ability to convert cyber content and cyber interactions to and from a universal interactive operating system standard format provides any cyber device, cyber content, cyber interaction, or cyber activity which does not use the universal interactive operating system with the interoperability to interact with an individual at an input output device or to interact with a cyber device which uses the universal interactive operating system. The conversion process which is a component of the disclosed single-point-of-access cyber system assures that a cyber device or cyber content or cyber interactions or cyber activities which are supported by a process for conversion to and from the universal interactive operating system form at will not become obsolete.

As an example, the cyber processes and cyber procedures of the universal interactive operating system, through use of captured images from a video camera, can convert a very old and generally obsolete form of communication such as Native American Indian smoke signals to a text message, or to a voice message, or to a system command, or to a cyber file.

As a further example, digital photos which were stored in cyber files using a prior art format from the late 1980's can be converted for interoperable use by the universal interactive operating system component of the single-point-of-access cyber system. Therefore, the digital photos in a late 1980's cyber format can be used by an individual as long as the universal interactive operating system component of the single-point-of-access cyber system is available for use by the individual.

(5) Expanded Overview

The disclosed single-point-of-access cyber system and method of the present embodiment are a combination of processes, procedures, programs, system architecture, device architecture, and cyber devices which together provide a safe and secure cyber environment for one or more individuals. In the provided safe and secure cyber environment an individual can have interoperable access to any desired and available cyber function. In addition, the disclosed single-point-of-access cyber system provides the individual with complete cyber privacy for the individual's personal and private cyber activities. Also, the disclosed single-point-of-access cyber system provides the individual with varying levels of cyber privacy as specified by the individual for the individual's public cyber activities.

As shown in FIG. 1, the three primary devices which make up the single-point-of-access cyber system 10 of the present embodiment are an input output device 100, a point of cyber access computer 200, and a cyber communications network 300.

Figure 2:
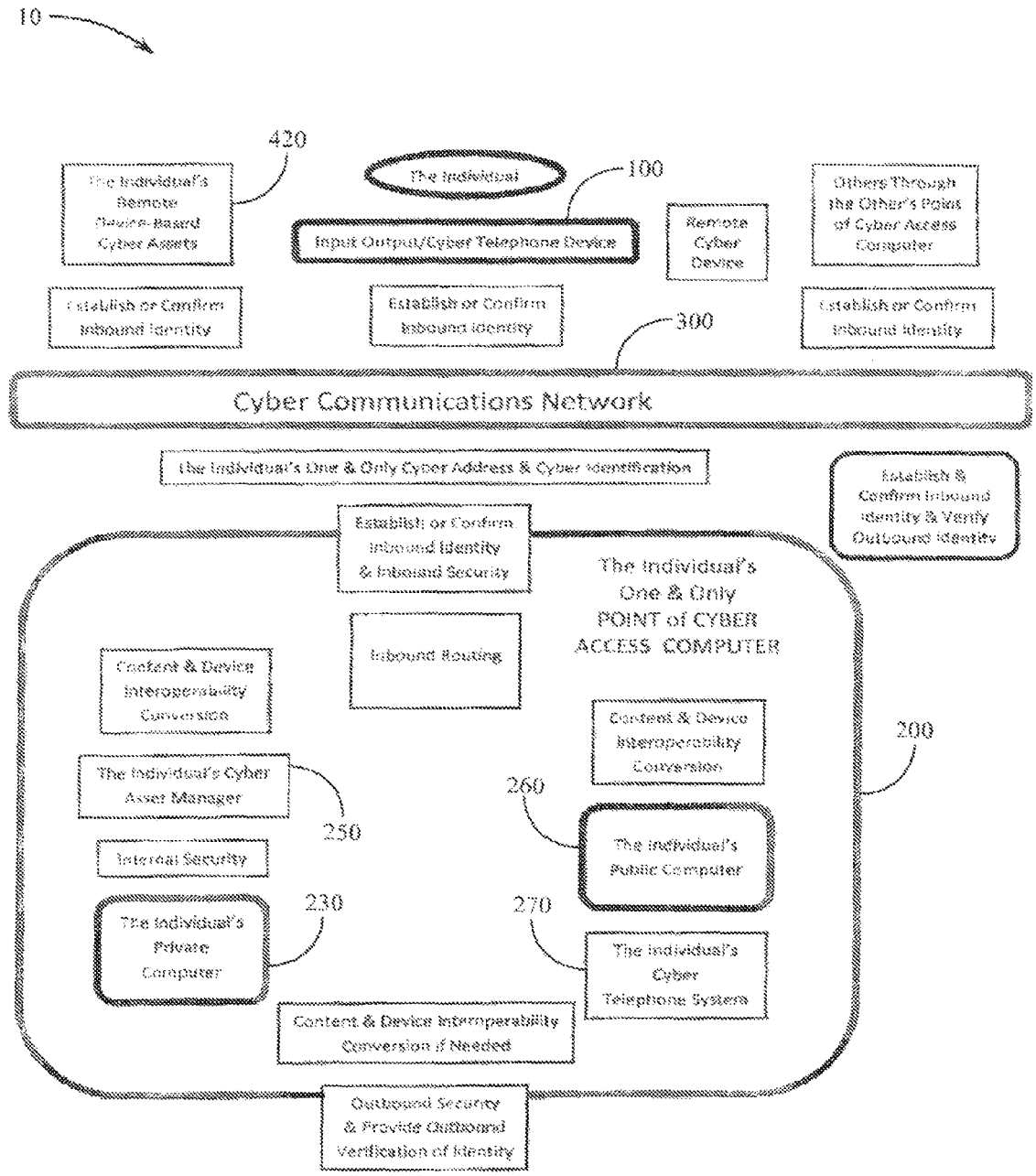
FIG. 2 is a schematic block diagram which illustrates the architecture and the architectural components of the single-point-of-access cyber system.

The architecture of the single-point-of-access cyber system 10 shown in FIG. 2 establishes a simple, concise, safe, and secure array of efficient paths for cyber interactions among an individual, cyber assets, cyber resources, and others.

The important cyber device architectural features and system architectural features which make up the single-point-of-access cyber system 10 are:

(a) integration of an individual's private and public interconnected cyber activities into one system;

(b) integration of an individual's private and public cyber activities and cyber interactions into the operations of one point of cyber access computer 200; and (c) the point of cyber access computer 200.

Figure 13:
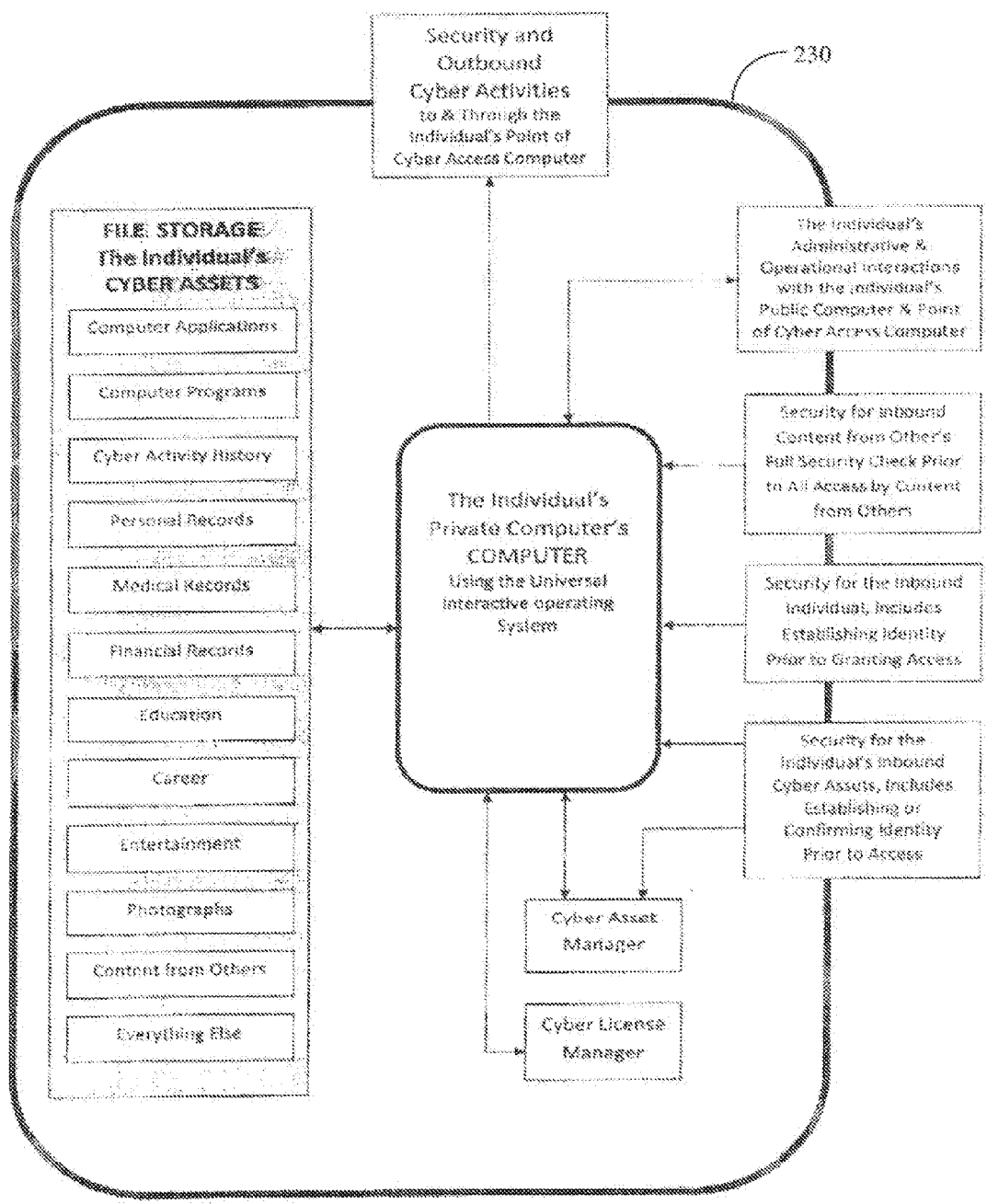
FIG. 13 is a schematic diagram which illustrates a private computer and the components, interconnections, and the associated cyber activities within.
Figure 14:
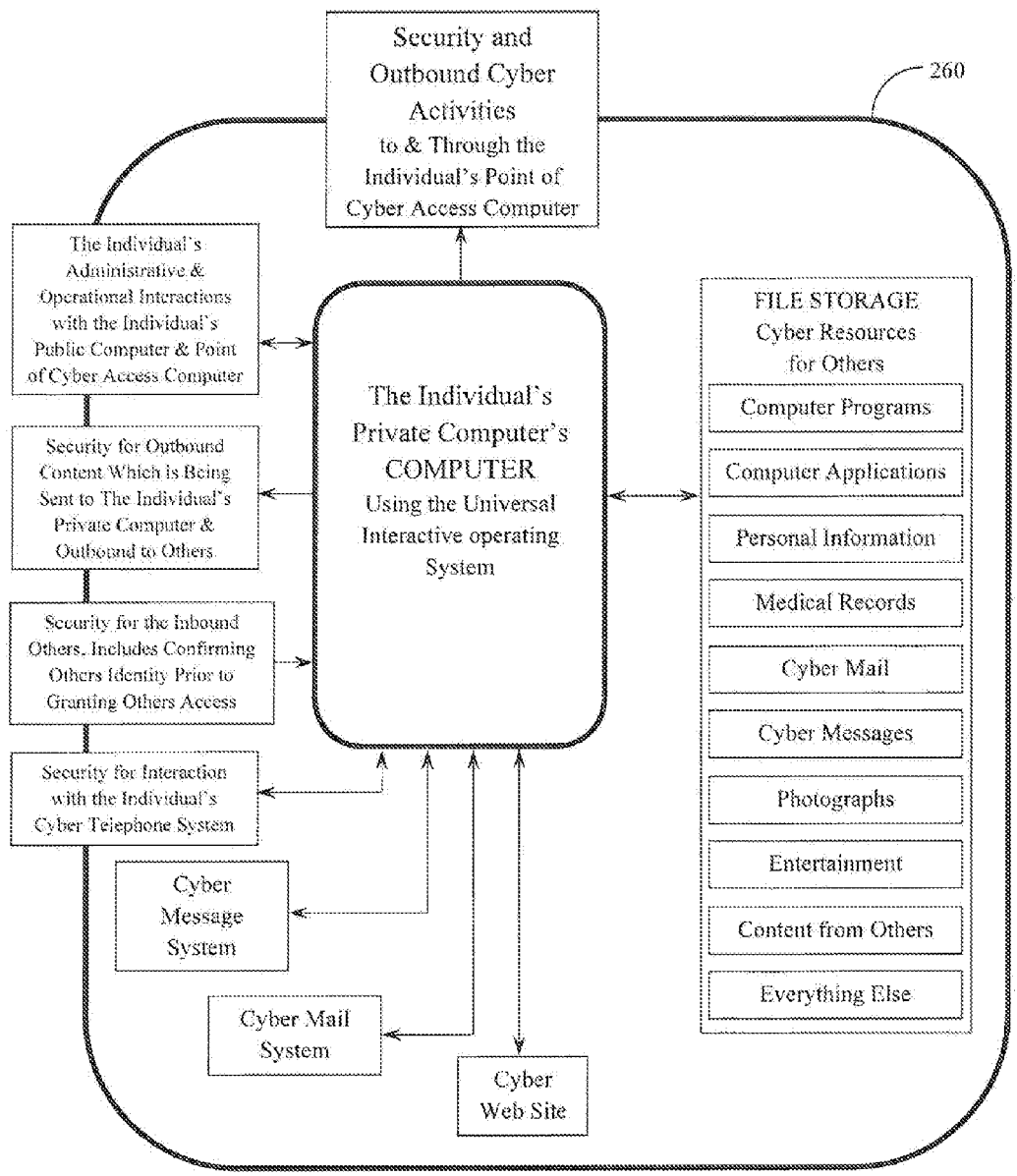
FIG. 14 is a schematic diagram which illustrates a public computer and the components, interconnections, and the associated cyber activities within.
Figure 15:
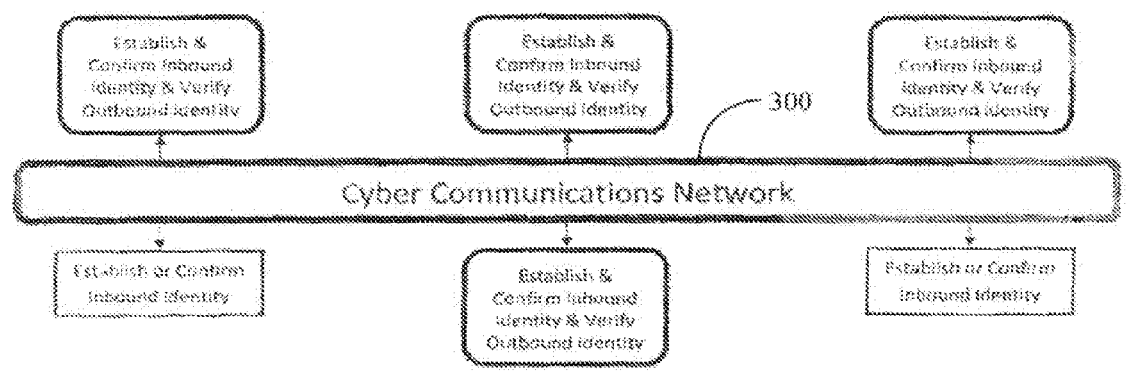
FIG. 15 is a schematic diagram which illustrates the cyber communications network of the single-point-of-access cyber system.

A still better understanding of the disclosed system may be had by understanding that the individual's point of cyber access computer includes a separate private computer 230 shown in more detail in FIG. 13 and a separate public computer 260 (shown in more detail in FIG. 14). The separate private computer 230 provides separate processing and support for the individual's private cyber activities. The separate public computer 260 provides separate processing and support for the individual's public cyber activities.

The individual's separate private computer 230 serves as a cyber vault. By functioning as a cyber vault, the individual's private computer 230 provides the individual with safety, security, and privacy for all of the individual's personal and private cyber activities. The individual's separate public computer 260 provides for cyber interactions between the individual and others.

As shown in FIGS. 1 and 2, the single-point-of-access cyber system 10 includes a secure thin input output device 100. This thin input output device 100 provides for remote cyber interactions between the individual and the individual's point of cyber access computer 200.

The single-point-of-access cyber system 10 provides for storage of a lifelong collection of the individual's file-based cyber assets.

The primary processes, procedures, and programs which make up the single-point-of-access cyber system 10 are:

(a) system-wide processes and procedures which identify each cyber device and each individual that is interacting with the disclosed single-point-of-access cyber system;

(b) a system-wide requirement that each individual using the disclosed single-point-of-access cyber system be properly identified prior to each step the cyber interactions of the individual carries out through the single-point-of-access cyber system;

(c) a system-wide requirement that each cyber device using the disclosed single-point-of-access cyber system be properly identified prior to each step each cyber interactions of the cyber device carries out through the single-point-of-access cyber system;

(d) a universal interactive operating system;

(e) a process for creating and using interactive cyber content;

(f) a process for providing cyber content interoperability by translating cyber content to and from a single-point-of-access cyber system cyber content format;

(g) a procedure which provides for a sender to send only pre-processed image-based cyber content to a recipient;

(h) a process for providing interoperability that translates cyber interactions to and from a single-point-of-access cyber system standard format;

(i) separate processing and support by a separate private computer for the private cyber activities of the individual; separate processing and support by a separate public computer for public cyber activities;

(j) processes and procedures which exclude cyber interactions from all others and cyber interactions from the cyber devices of all others from gaining access to the individual's private computer;

(k) processes and procedures which provide an individual with exclusive and complete administrative control, operational control, and access control of the individual's point of cyber access computer, the individual's public computer, the individual's private computer, and the individual's device-based cyber assets; and (l) processes and procedures for providing an individual with the ability to selectively grant or deny specified others access to the individual's point of cyber access computer, to the individual's cyber telephone system, to the individual's public computer, and to the individual's cyber resources which are available through the individual's public computer.

Figure 3:
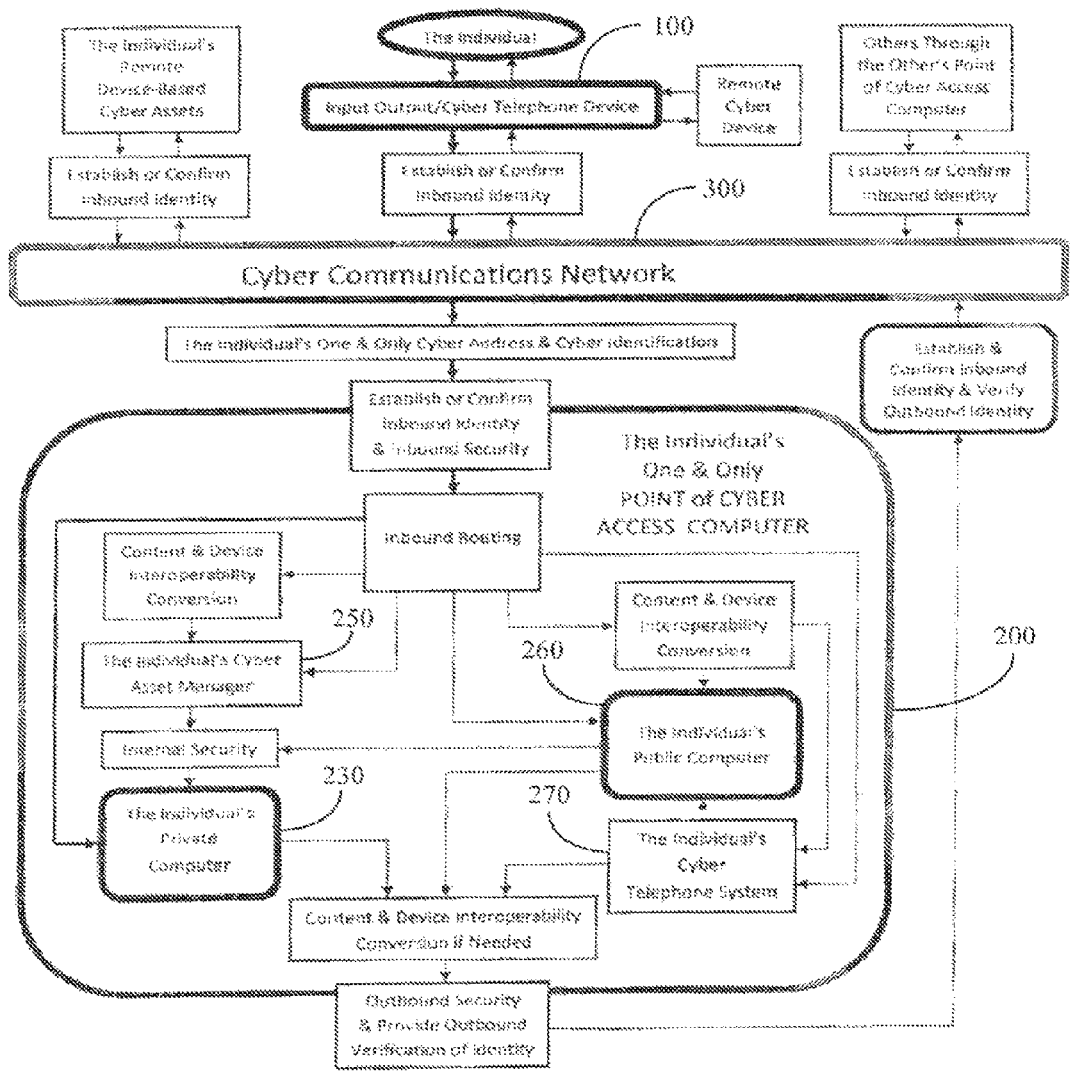
FIG. 3 is a schematic block diagram which illustrates the interconnections and the cyber activities which occur within the architecture of the single-point-of-access cyber system.
Figure 4:
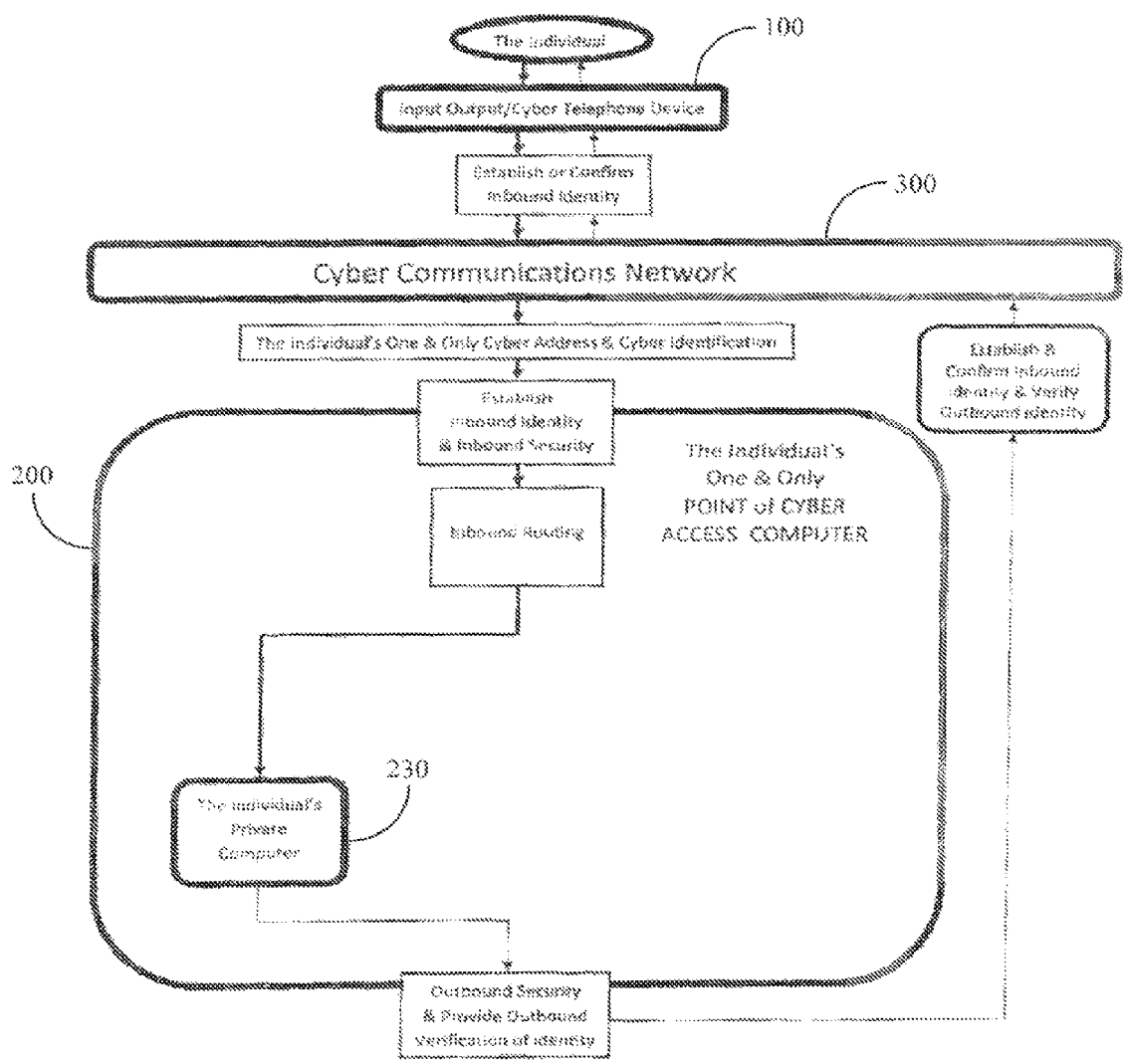
FIG. 4 is a schematic block diagram which illustrates the single-point-of-access cyber system and the associated cyber activities of the individual.
Figure 5:
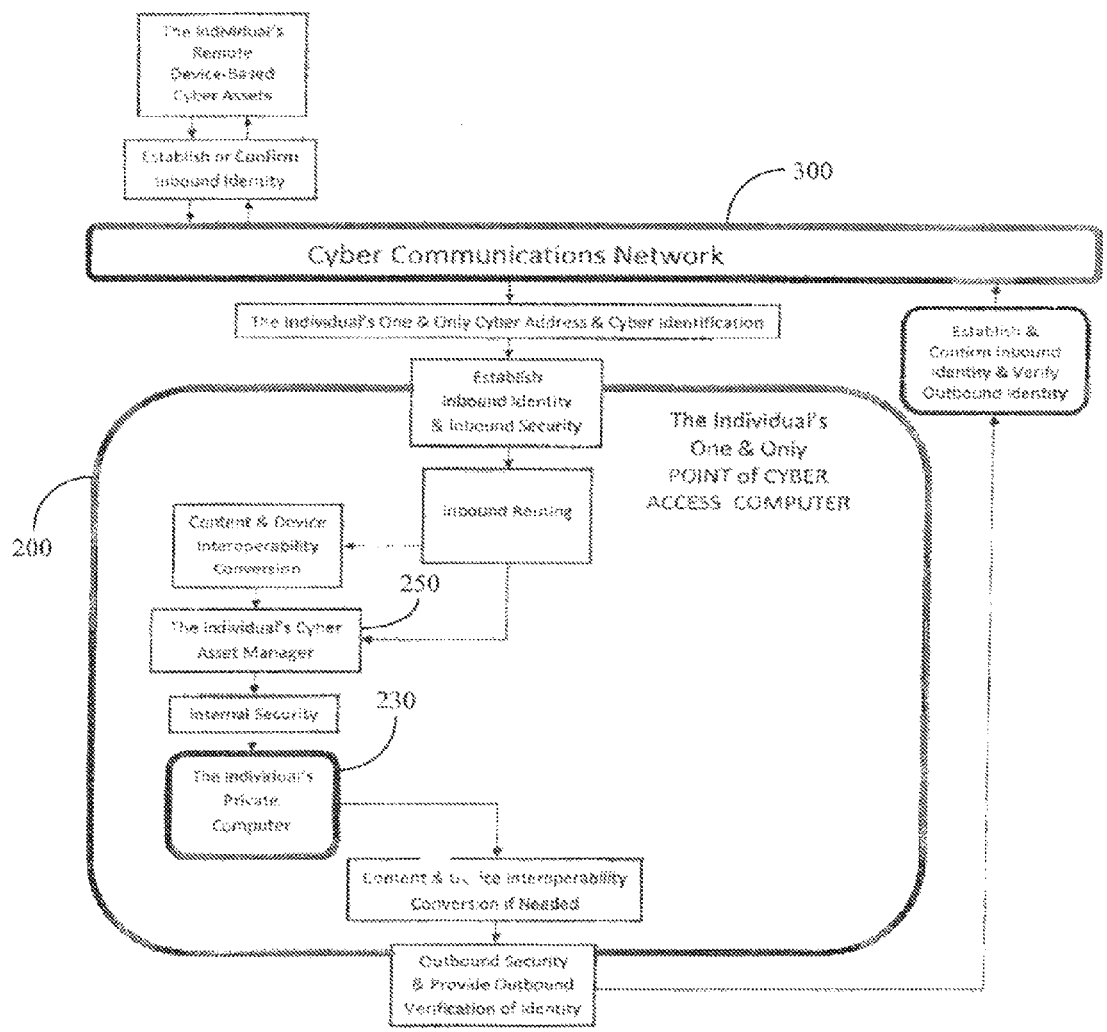
FIG. 5 is a schematic block diagram which illustrates the cyber activities associated with the individual's device-based cyber assets.
Figure 6:
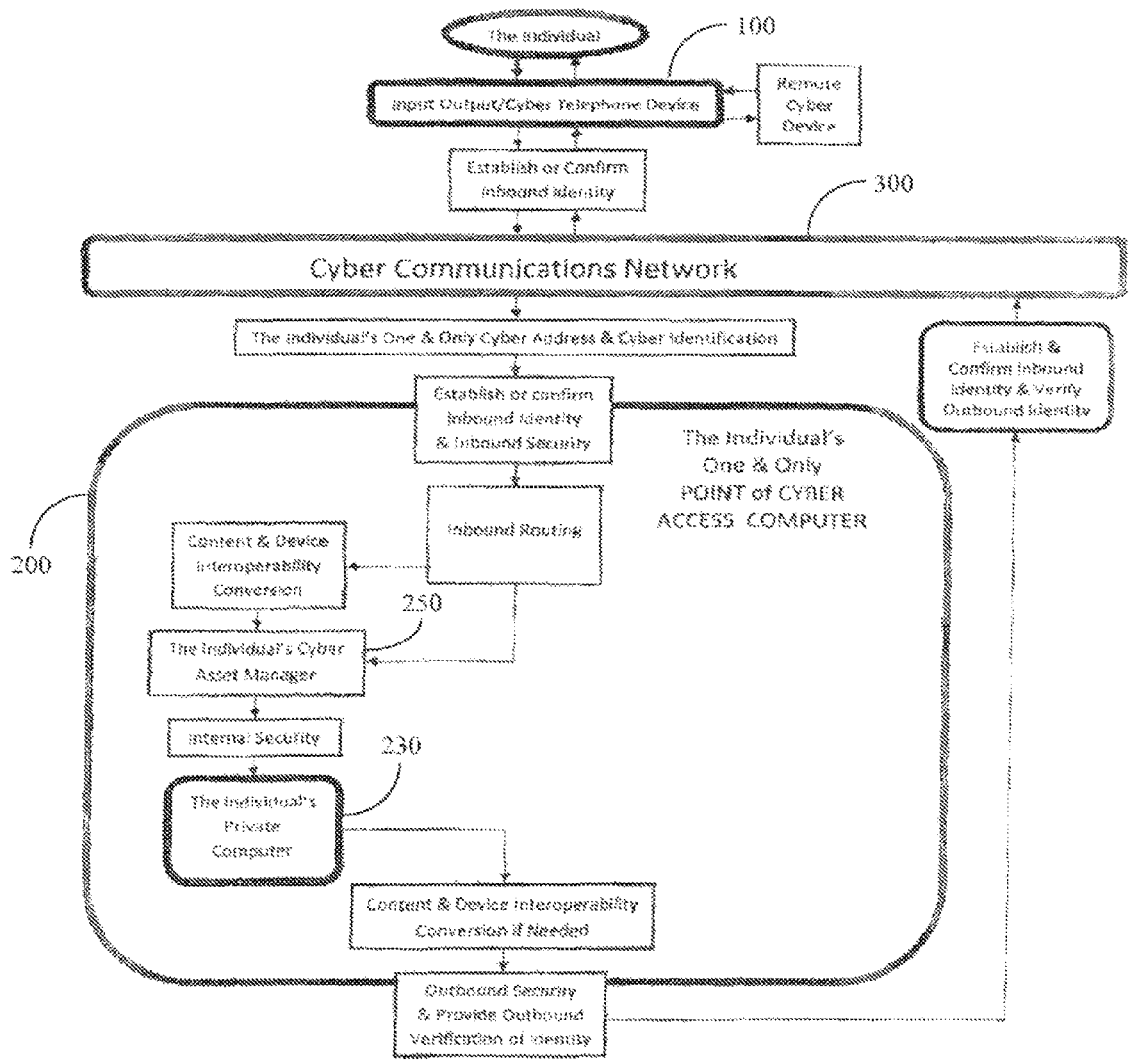
FIG. 6 is a schematic block diagram which illustrates the cyber activities associated with the individual and the cyber activities associated with a remote cyber device.
Figure 7:
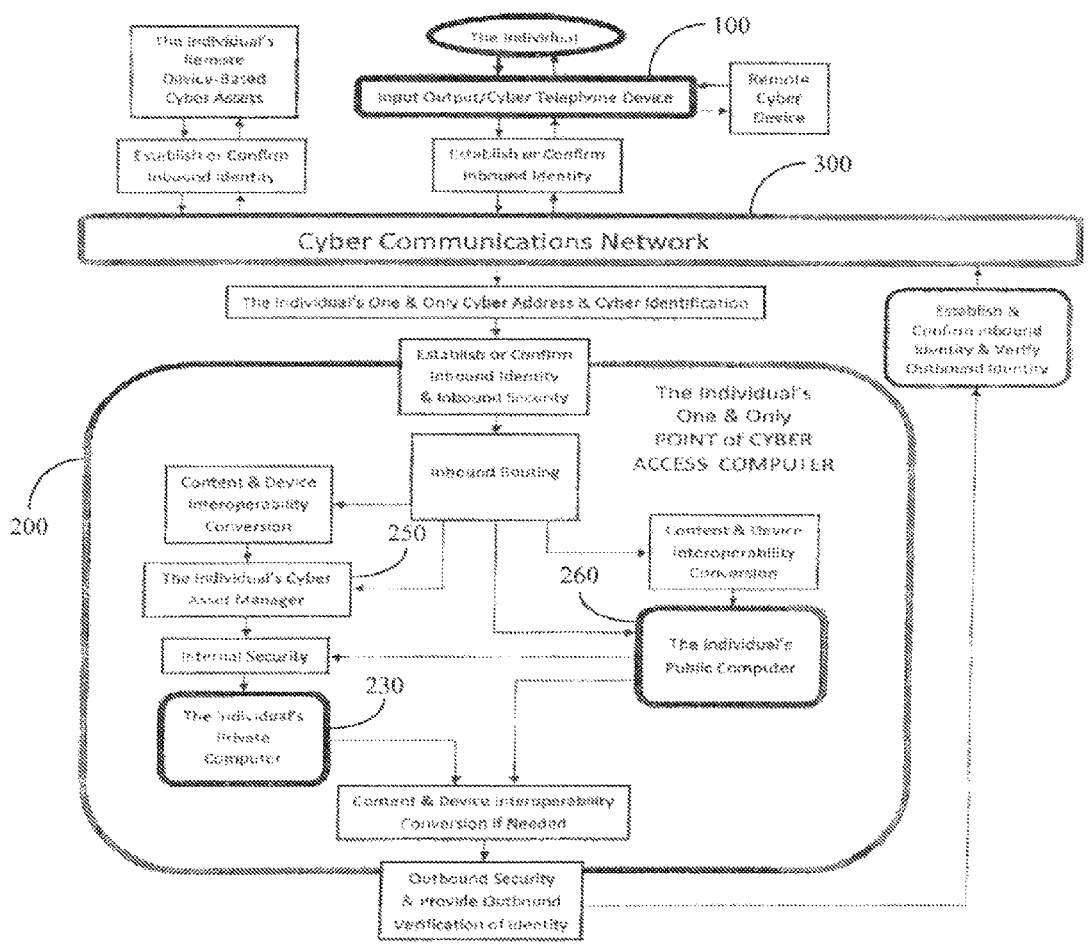
FIG. 7 is a schematic diagram which illustrates the cyber activities associated with the individual's device-based cyber assets, as well as the cyber activities associated with the individual, and those associated with a remote cyber device.
Figure 8:
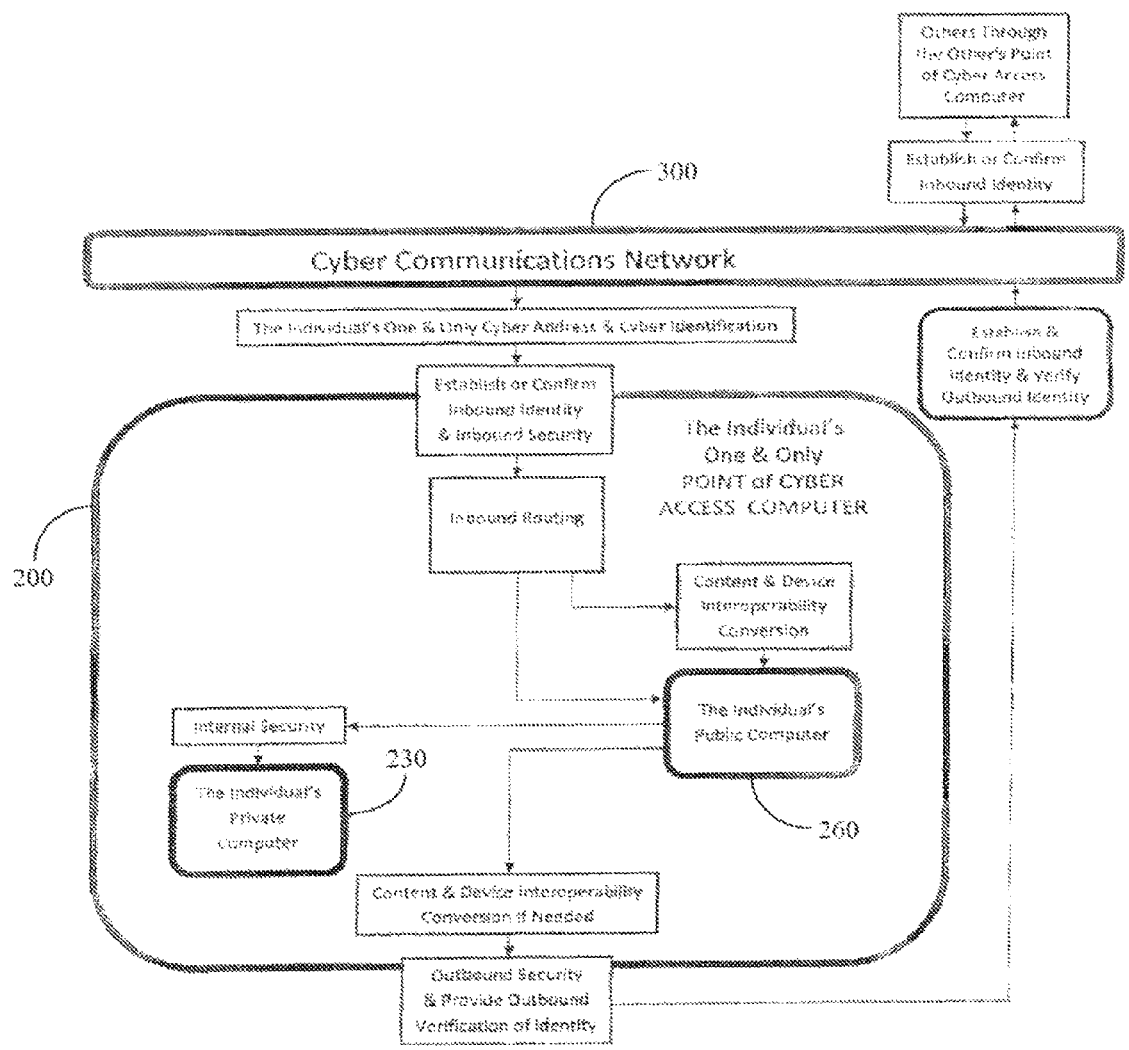
FIG. 8 is a schematic diagram which illustrates the cyber activities occurring between others and the individual's public computer.
Figure 9:
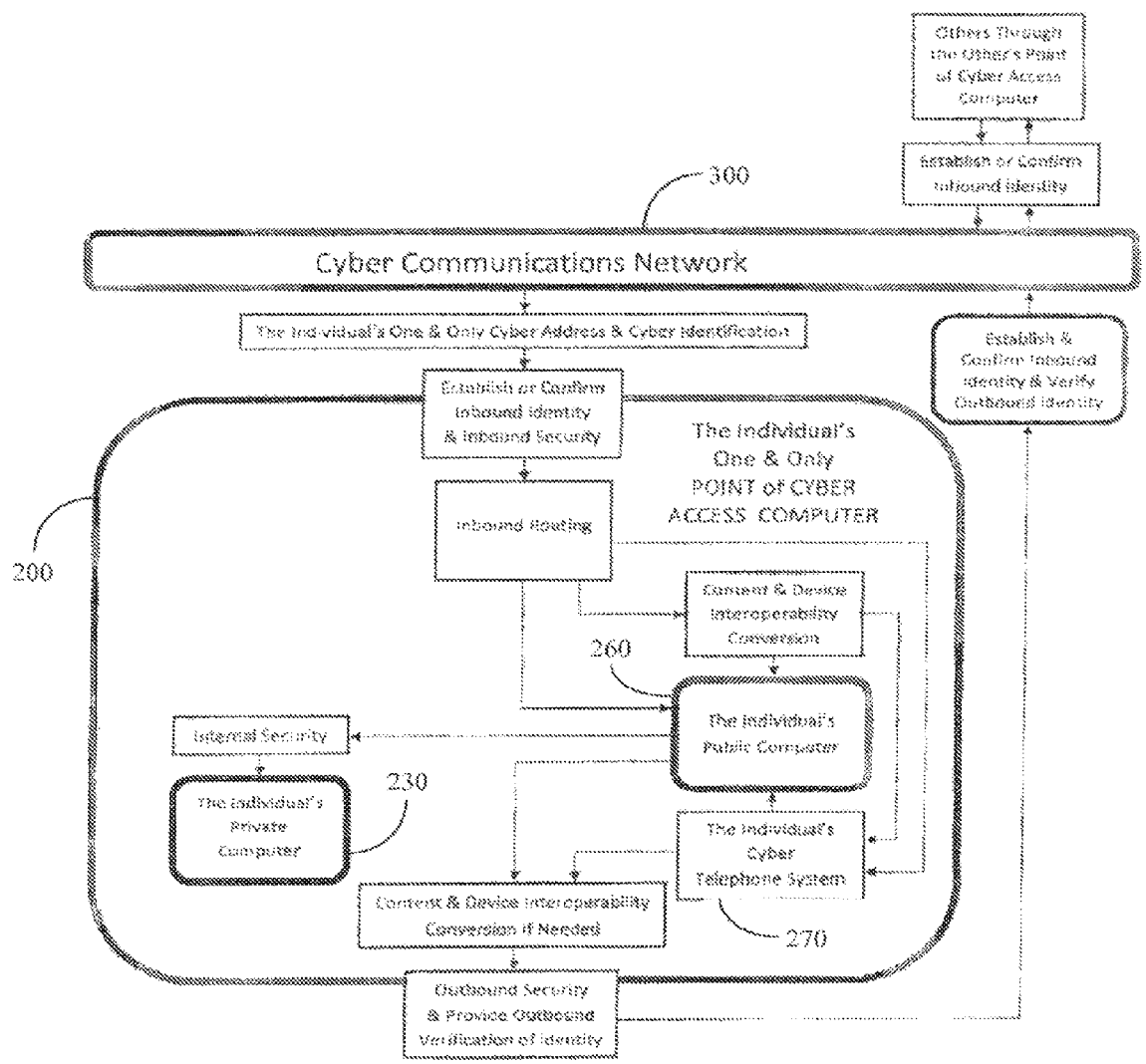
FIG. 9 is a schematic diagram which illustrates the cyber activities occurring between others and both the individual's public computer and the individual's cyber telephone system.
Figure 10:
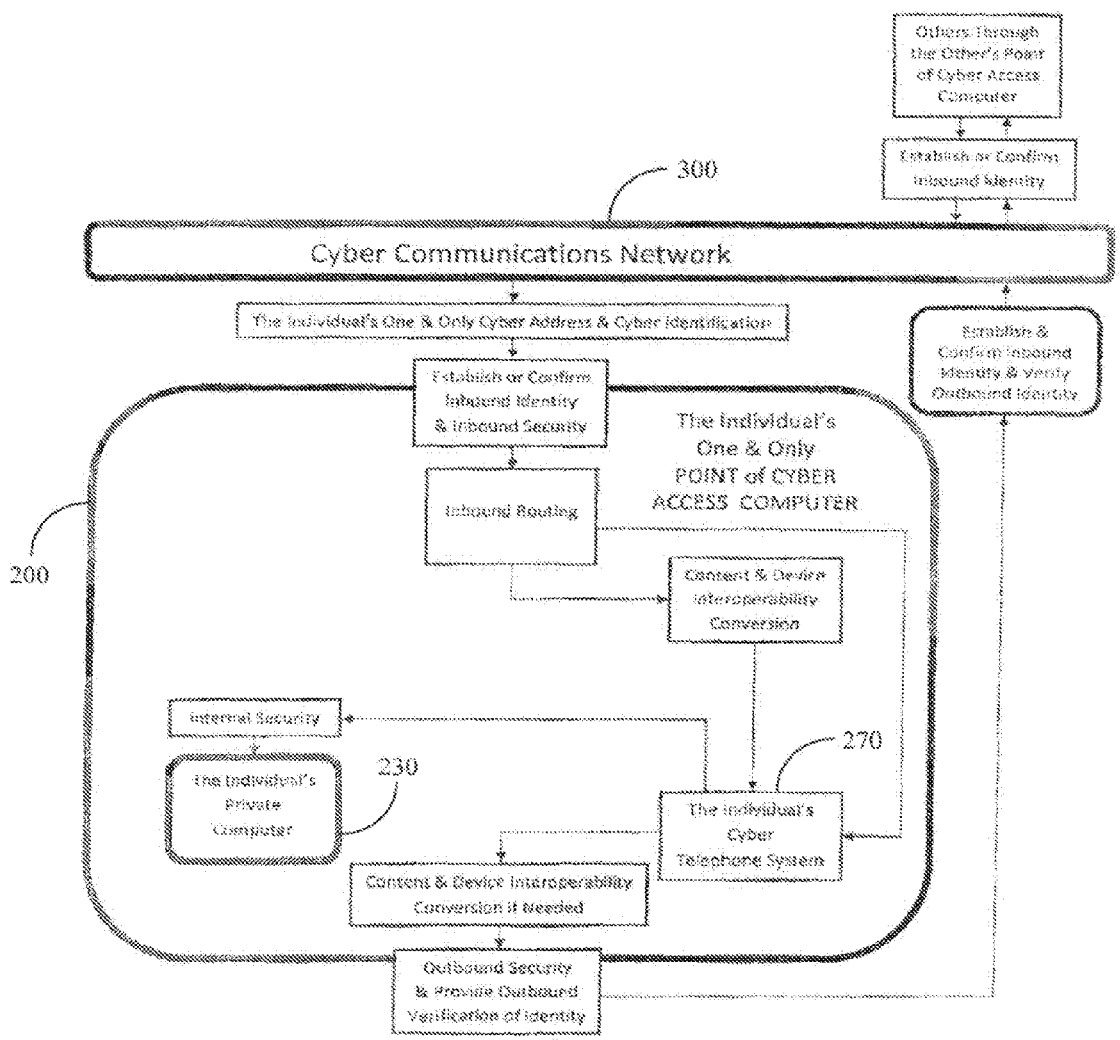
FIG. 10 is a schematic diagram which illustrates the cyber activities occurring between others and the individual's cyber telephone system.

The foundation for the disclosed single-point-of-access cyber system 10, as shown in FIG. 3, is the requirement that each individual and each cyber device be properly identified prior to each step the cyber interactions of the individual or the cyber device carries out through the single-point-of-access cyber system.

This foundational requirement for proper identification of the individual, others, and every cyber device provides the safe and secure cyber environment which provides a level of cyber safety, cyber security, and cyber privacy that far exceeds what is found in prior art systems. This foundational requirement also establishes a framework which supports cyber personal rights, cyber privacy rights, and cyber property rights for every The single-point-of-access cyber system provides an individual with only one unique lifelong single-point-of-access cyber system identification. This unique lifelong single-point-of-access cyber system identification, when combined with the single-point-of-access cyber system address of the individual's point of cyber access computer 200, provides all that others need to know to contact the individual for any cyber interaction or any cyber activity.

As shown in FIGS. 1, 2, and 3, the single-point-of-access cyber system 10 also includes an input output device 100. The input output device 100 provides the individual with the ability to use the input output device 100 for secure remote cyber interactions with the individual's point of cyber access computer 200. An example of an input output device 100 appears in FIGS. 16A-16F.

Figure 16A:
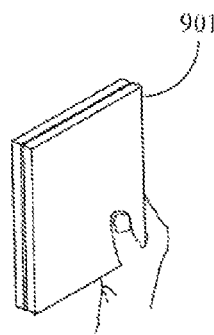
FIGS. 16A-16F are illustrations of a two-screen input output device which can be configured for use in multiple forms.
Figure 16B:
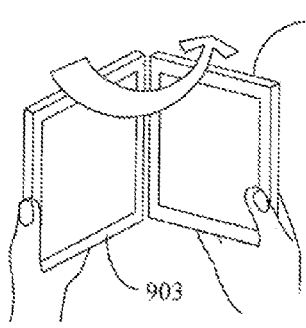
Figure 16C:
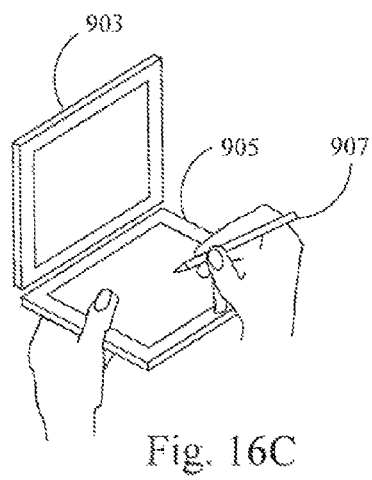

As shown in FIG. 16B, for example, the input output device 901 may include two screens 903 & 905 hinged together like a book. As shown in FIG. 16C, a stylus 907 may be used by the individual for interaction with the input output device 901. Further adaptability of the input output device appears in FIG. 16D where screen 905 may be rotated with respect to screen 903. Once rotated, screens 903 & 905 may be folded back together as shown in FIG. 16E. When folded together as in FIG. 16F the individual may again use a stylus 907 to interact with one of the screens on the input output device. Each configuration of the input output device 901 may relate to a different functionality provided to the individual by the input output device 901.

Those with ordinary skill in the art will understand that the input output device 901 shown in FIGS. 16A-16F is but one of many different types of devices which may serve as an input output device 100 which can be used with the disclosed single-point-of-access cyber system 10.

As shown in FIG. 3, an individual, through use of the input output device 100, communicates information to the individual's point of cyber access computer 200. This communication first allows the individual's point of cyber access computer 200 to establish the individual's identity. After the individual's identity has been established by the individual's point of cyber access computer 200, the individual gains access to any of the cyber assets and the cyber resources which are available to the individual through the individual's point of cyber access computer 200.

Once the individual's identity has been established by the individual's point of cyber access computer 200, the individual's point of cyber access computer 200 provides the individual with an array of functionalities including but not limited to: computing capabilities; computer programs, computer applications; a cyber telephone; a cyber video telephone; cyber messaging; cyber mail; cyber television; cyber video entertainment; cyber radio; cyber music; verification of the individual's identity for all of the individual's public cyber activities; cyber interactions with the individual's cyber assets; cyber interactions with others; and cyber interactions with the cyber resources of others. Further, the individual is provided with the option to have exclusive operational control of the individual's point of cyber access computer's: operational functions, system access functions, systems management functions, and systems configuration functions.

The point of cyber access computer 200 includes two additional and separate computers for two separate areas of operation which are:

(a) the individual's private computer 230, shown schematically in greater detail FIG. 13, which can only be accessed by the cyber interactions of the individual and the cyber interactions of the individual's device-based cyber assets; and (b) the individual's public computer 260, shown schematically in greater detail in FIG. 14, which provides specified others with access to specified cyber resources which have been made available to specified others by the individual.

The private computer component 230 of the individual's point of cyber access computer 200 establishes a new dimension for an individual's cyber activities. This new dimension is a high level of privacy, safety, and security that is not provided by systems in the prior art.

Only the cyber interactions of the individual and the cyber interactions of the individual's device-based cyber assets can gain access to the individual's private computer 230. Only after the individual's point of cyber access computer 200 has established the individual's identity or the identity of the individual's device-based cyber assets will access be granted to the individual's private computer 230. This means that the cyber interactions of no others can gain access to the individual's private computer 230. This feature of the single-point-of-access cyber system 10 provides the individual with absolute privacy, safety, and security for the individual's cyber activities which occur within the individual's private computer 230.

An individual's point of cyber access computer 200 may contain the entire working collection of the individual's file-based cyber assets and file-based cyber resources.

Through use of his or her own private computer 230, the individual has access to one or more of the following: computing capabilities; computer programs; computer applications; a cyber telephone; a cyber video telephone; cyber messaging; cyber mail; cyber television; cyber video entertainment; cyber radio; cyber music; cyber interactions with available cyber resources of others, or any other cyber interactions of any type, Further, through the individual's use the individual's own private computer 230, the individual is provided with the option to have exclusive operational control of the individual's point of cyber access computer's, the individual's private computer's, and the individual's public computer's: system management functions; system configuration functions; and system access functions. The individual is also provided with operational control of the access control functions of the individual's cyber assets which the individual chooses to make available as cyber resources for use by specified others.

An individual's cyber assets include all of the individual's cyber devices, programs, applications, processes, procedures, and files which use non-biological processing.

Cyber assets are the property of an individual. An individual can share any part of the individual's file-based cyber assets with specified others. When the individual makes a copy of the individual's file-based cyber assets available for specified others it is made available through the individual's public computer 260. Copies of the individual's file-based cyber assets which are made available to specified others through the individual's public computer 260 are called cyber resources.

An individual's file-based cyber assets include, but are not limited to, one or more of the following: personal records; financial records; health records; cyber history; photographs; cyber books; cyber magazines; music; videos; computer programs; computer applications; and cyber files of any type.

An individual's device-based cyber assets, at a minimum, consist of the individual's point of cyber access computer 200. The individual's device-based cyber assets can also include, but are not limited to, one or more of the following: an input output device; an audio output/video display device; a cyber telephone device; a health monitoring device; a vehicle; a cyber file backup-and-restore device; a video camera; a home or office cyber automation device which may control and/or monitor lights, locks, security system, thermostat, refrigerator, lawn sprinkler system, water heater operation, water or electric consumption, garage door opener, dog door, printer, private weather station, etc.; or a GPS position locating device; and any other device-based cyber assets with which an individual may interact.

As shown in FIG. 3, security processes and procedures are used for all inbound cyber activities, for all inbound cyber interactions, and for all inbound cyber content which transfer to the individual's private computer 230 from the individual's point of cyber access computer 200 or from the individual's public computer 260.

Also as shown in FIG. 3, the individual's public computer 260 is the individual's portal for: cyber activities; cyber interactions; and the transfer of cyber content to and from others.

An individual's point of cyber access computer 200 provides verification of the individual's identity for the individual's outbound cyber activities and for the individuals outbound cyber interactions.

The single-point-of-access cyber system mandates that the devices within the cyber communications network 300 between the input output device 100 and the point of cyber access computer 200, which comes in first contact with a sender's cyber interactions, establishes the identity of the sender's point of cyber access computer and the input output device that is being used by the sender prior to transferring the sender's cyber interactions. The device within the cyber communications network 300 which comes in first contact with the sender's cyber interaction from the sender's point of cyber access computer is subsequently required to provide verification of the identity of the sender's point of cyber access computer 200 prior to each step the sender's cyber interaction takes through the single-point-of-access cyber system 10.

For a cyber interaction from an other to gain access to the individual's point of cyber access computer 200, the individuals point of cyber access computer 200 must have received verification of the single-point-of-access cyber system identification of the other. Then the individual's point of cyber access computer 200 must confirm the others verified identity. Once the verified identity of the other has been confirmed, the cyber interaction from the other can then be granted access to the individual's point of cyber access computer 200.

Others gain access to the individual's point of cyber access computer 200 and to the individuals public computer 260 for the purposes of cyber activities and cyber interactions.

An individual has the ability, through use of the access and management functions of the individual's separate private computer 260, to specify to whom the individual grants or denies access to:

the individual's point of cyber access computer 200;
the individual's cyber telephone system 270; and
the individual's public computer 260.

Further, the individual can grant or deny each specified other access to all, or any part, of the cyber resources which are available to specified others through the specified others' use of the individual's public computer 260.

Others who are granted access to all or part of an individual's cyber resources, or to the individual's cyber telephone system 270, or to the individual's public computer 260, can only request that the individual or the individual's point of cyber access computer 200, or the individual's public computer 260, or the individual's private computer 230, respond to the other's cyber interaction.

Only the individual, through cyber interactions with the individual's point of cyber access computer 200, or the individual's public computer 260, or the individual's private computer 230, may send cyber interactions from the individual's point of cyber access computer 200 to others.

Others are excluded from gaining operational, access, or administrative control of the individual's cyber resources. Further, others are excluded from gaining operational, access, or administrative control of any part of the individual's public computer 260.

Cyber interactions from the individual's point of cyber access computer 200 to the input output device 100 that is being used by the individual as shown in FIG. 3 are pre-processed as image or audio based content prior to being sent, as opposed to sending cyber interactions as files which need to be processed into image or audio based content by the input output device.

A recipient can respond to a single-point-of-access cyber system formatted interaction from a sender by communicating to the sender:

(a) the recipient's specific input;
(b) the specific point where the recipient's cyber interaction was made; and
(c) the identification of the sender's specific content which was perceived by the recipient at the point in time when the recipient's cyber interaction was made.

The disclosed system provides a frames and scrolls format for image-based cyber content. Using the frames and scrolls format, as shown in greater detail in the array of images in FIGS. 18A-18G for image-based single-point-of-access cyber system content, a recipient can respond to a cyber interaction from the sender by communicating the recipient's specific input, at the specific point, and on the specific image which the recipient perceived.

Figure 18A:
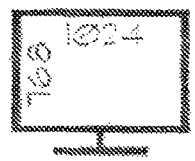
FIGS. 18A-18G are illustrations depicting cyber images in both frame format and scroll format.
Figure 18B:
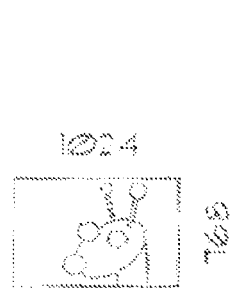
Figure 18C:
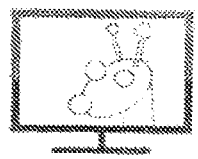
Figure 18D:
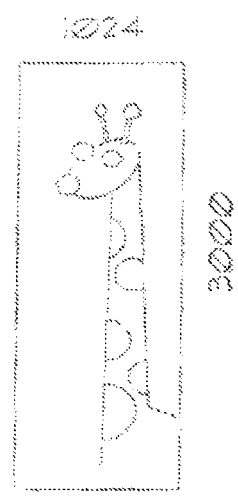
Figure 18E:
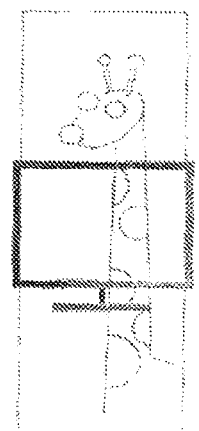
Figure 18F:
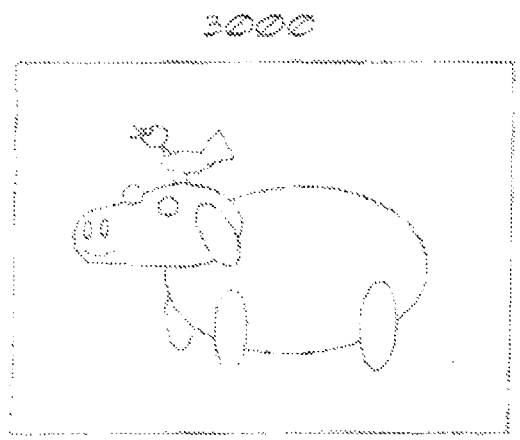
Figure 18G:
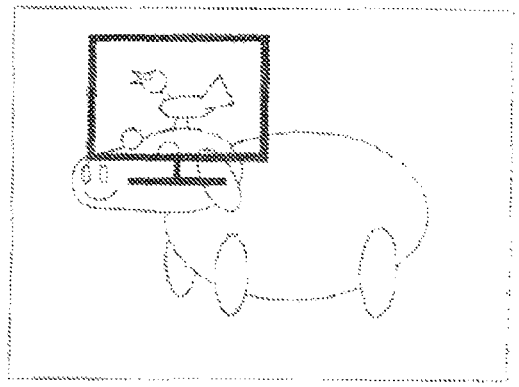

Shown in FIG. 18A, as an example, is a screen which is similar to screens 903 and 905 shown in FIGS. 16A-16F the size of the screen is 1024 pixels wide by 768 pixels high. An image having a dimension larger than 1024 pixel wide×768 pixel high, such as the 1024 pixels wide by 3000 pixels high image shown in FIG. 18D, will not appear in its entirety on a 1024 pixel wide×768 pixel high image display screen. Rather, only a portion of the image shown in FIG. 18D will appear at one time on a screen such as shown in FIG. 18E, or in FIG. 18G using the disclosed frames and scrolls format. As shown in FIGS. 18E and 18G, the disclosed scrolls format may be used when one or both of the two image dimensions are larger than what can be presented at one time on a single screen.

As shown in FIG. 3, an individual's point of cyber access computer 200 may also include a cyber telephone system 270. The cyber telephone system 270 provides for all aspects of the individual's needs or desires for cyber telephone services. The individual's cyber telephone system 270:

(a) provides a history of cyber telephone system activities;
(b) grants or denies cyber telephone communication interactions from others, access to all or any part of the individual's cyber telephone system;
(c) routes cyber telephone communications interactions, and related cyber alerts, to an input output/cyber telephone device which is on, or near, the individual, or which is specified for use as a cyber telephone contact device by the individual;
(d) records messages from inbound cyber telephone communications interactions;
(e) delivers messages to specified others; and
(f) provides any other cyber telephone services or functions which are needed or desired by the individual.

A key feature of the disclosed single-point-of-access cyber system 10 is that it has differences among operations, processes, code, transfer packets, and formats for: cyber interactions; cyber telephone communications; cyber mail; cyber messages; cyber television; cyber video entertainment; cyber music; file transfers; computer programs, computer applications; operational controls; and any other required or desired function. The reason for the use of differences among operations, processes, code, transfer packets, and formats is to provide for security between different processes, to assure proper routing, and to assure that cyber interaction for one specific purpose cannot and will not be used for a different purpose.

The single-point-of-access cyber system 10 cyber communications network 300 requires that an individual be properly identified prior to each step the individual's cyber interactions carries out through the single-point-of-access cyber system 10 cyber communications network 300.

The single-point-of-access cyber system 10, cyber communications network 300 requires each cyber device be properly identified prior to each step the cyber device's cyber interactions take through the single-point-of-access cyber system 10, cyber communications network 300.

The single-point-of-access cyber system 10 requires all cyber activities to be properly formatted. Further, the single-point-of-access cyber system 10 requires all cyber activities keep a history of each step the cyber activities carries out through the cyber communications network 300 and through the single-point-of-access cyber system 10.

The single-point-of-access cyber system 10 has policies, procedures, and devices which are used for cyber interaction among the individual, the individual's point of cyber access computer 200, the individual's private computer 230, and the individual's remote device-based cyber assets 420 (FIG. 2). These policies, procedures, and devices provide for safe and secure cyber interactions between the individual's remote device-based cyber assets 420 and the individual or the individual's private computer 230 or the individual's point of cyber access computer 200. In addition, these policies, procedures, and devices exclude others from gaining access to the individual's cyber assets.

Another key feature of the disclosed single-point-of-access cyber system 10 is the universal interactive operating system. The programming which makes up the universal interactive operating system provides processes and procedures. The processes and procedures provide an interoperable interconnected cyber environment. Within the interoperable cyber environment any cyber device can use the safety and security of the single-point-of-access cyber system 10 for interconnected cyber interactions.

It makes no difference which operating system is used by a sender of a cyber interaction or which operating system is used by the recipient of a cyber interaction as long as the cyber interaction between the sender and the recipient uses the universal interactive operating system of the disclosed system for interoperable interconnected interaction.

The universal interactive operating system which is used in the disclosed single-point-of-access cyber system has interoperability processes which translate cyber interactions, cyber activities, and cyber content to and from standard universal interactive operating system format.

The individual's point of cyber access computer 200, the individual's private computer 230, and the individual's public computer 260, keep a history of cyber activities from within the cyber domain of the individual.

Figure 17:
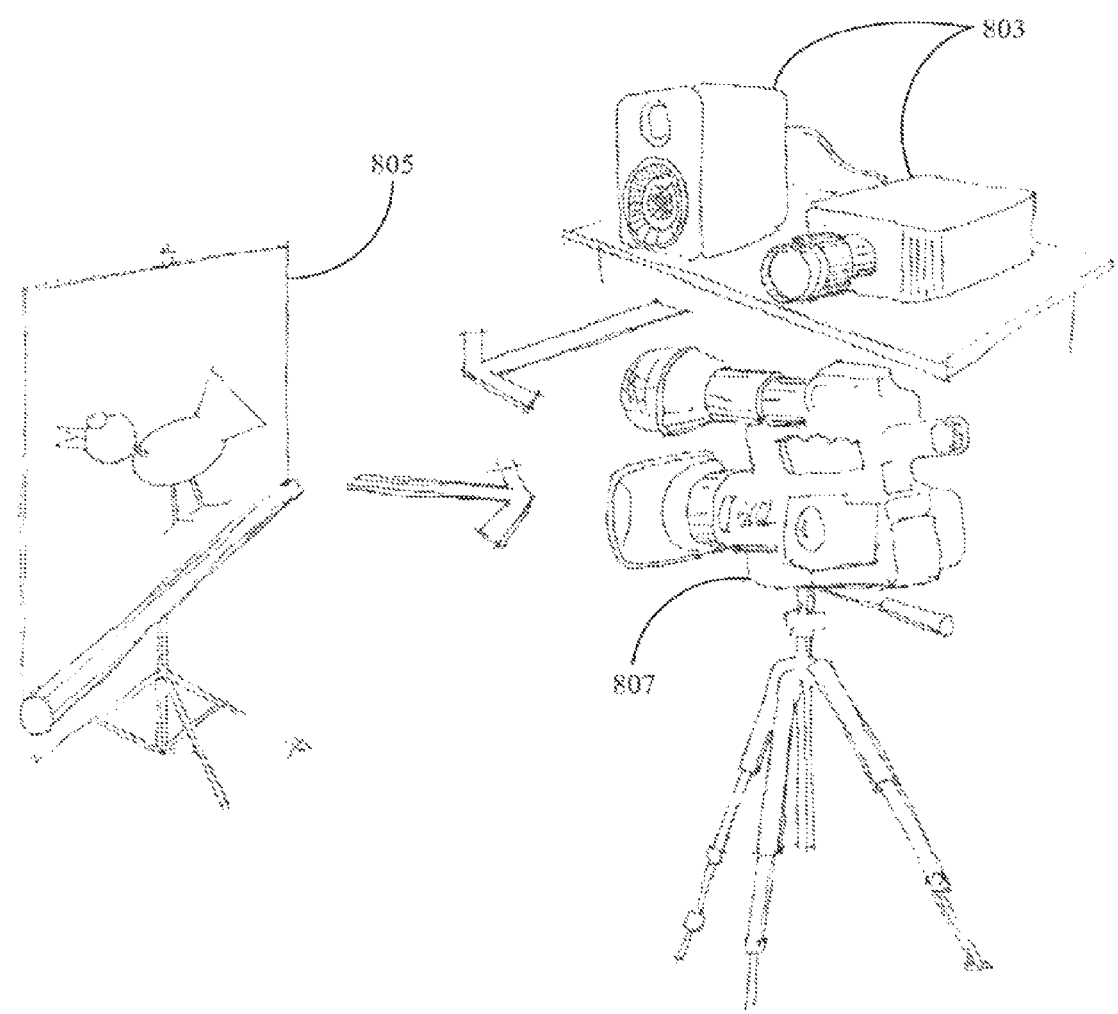
FIG. 17 is an illustration of a group of virtual processes which are used for security, for interoperability conversion, and for making alterations to images.

As shown in FIG. 17, the universal interactive operating system includes, for example, resource-efficient processes and procedures which use one or more virtual projectors 803, and one or more virtual projection display screens 805, and one or more virtual recorders or capture devices 807 to: convert cyber content for interoperability; convert cyber interactions for interoperability; alter images; alter audio; converge two or more sources of image-based cyber content into one or more converged sources of image-based cyber content.

(6) Single-Point-of-Access Cyber System Architecture

As shown in FIG. 2, the architecture of the disclosed single-point-of-access cyber system 10 defines the interrelationship of the components of the disclosed single-point-of-access cyber system 10. The architecture of the single-point-of-access cyber system 10 also defines the components of the disclosed single-point-of-access cyber system 10. Specifically the components of the single-point-of-access cyber system 10 include architectural rules and requirements, system structure, one or more point of cyber access computers 200, one or more input output devices 100, one or more cyber devices, a cyber communications network 300, and a universal interactive operating system. Optionally, the components of the single-point-of-access cyber system 10 can further include one or more cyber asset managers 250 and one or more cyber telephone systems 270 or any other component.

The architecture of the disclosed single-point-of-access cyber system 10 provides architecture for an interconnected cyber system in which one or more point of cyber access computers 200, and one or more input output devices 100, and one or more cyber devices, have cyber interactions using the cyber communications network 300 and the universal interactive operating system.

The device architecture which is a part of the disclosed single-point-of-access cyber system 10 provides for a point of cyber access computer 200, or a private computer 230, or a public computer 260, or a cyber device to be a physical device, to be a virtual device, or to be a combination thereof.

The architecture of the disclosed single-point-of-access cyber system 10 provides for the addition of, and the removal from, and the reconfiguration of the arrangement of, the cyber processes and the cyber procedures of the single-point-of-access cyber system 10.

The architecture of the disclosed single-point-of-access cyber system 10 provides for the addition of, the removal from, and the reconfiguration of the arrangement of, cyber components and cyber devices which are a part of the single-point-of-access cyber system 10.

The architecture of the disclosed single-point-of-access cyber system 10 provides device architecture. The device architecture in turn provides for separate processing and support for an individual's private cyber activities, as well as separate and different processing and support for an individual's public cyber activities.

The device architecture of the disclosed single-point-of-access cyber system 10 further provides for a point of cyber access computer 200 which is a combination of three separate, yet interconnected computers. The first computer is the point of cyber access computer 200; the second computer is a private computer 230; and the third computer is a public computer 260. The three separate computers can be integrated into one single device, or, one or more of the three separate computers may be physically separate computers which may also be physically located at one or more locations.

The device architecture of the disclosed single-point-of-access cyber system 10 provides for the addition of, the removal from, and the reconfiguration of the arrangement of: the components, the cyber processes, and the cyber procedures of a single-point-of-access cyber system cyber device.

The architecture of the disclosed single-point-of-access cyber system 10 provides for the use of system-standard interface and interaction cyber processes and cyber procedures. The system-standard interface and interaction cyber processes and cyber procedures provide an environment of cyber interoperability where any cyber device can be seamlessly used as a part of the single-point-of-access cyber system 10.

According to the architectural rules and regulations of the disclosed single-point-of-access cyber system 10, it is a requirement that the individual's point of cyber access computer 200 establishes or confirms the identity of the individual, or the identity of others, or the identity of a cyber device, prior to providing point of cyber access computer access to cyber interactions from the individual, or from others, or from a cyber device.

It is also a requirement of the architectural rules and regulations of the architecture of the disclosed single-point-of-access cyber system 10 that proper identification of each individual is made prior to each step the cyber interactions of the individual take through the single-point-of-access cyber system 10. The architectural rules and regulations also require proper identification of each cyber device prior to each step that the cyber interactions of the cyber device take through the single-point-of-access cyber system 10.

The architectural rules and regulations require that an individual's private computer 230 can only be accessed by cyber interactions from an input output device 100 that is being used by the individual or by cyber interactions from the individual's device-based cyber assets. Further, the architectural rules and regulations require that the individual's private computer 230 can only be accessed through the individual's point of cyber access computer 200.

The architectural rules and regulations provide for an individual's public computer 260 to only be accessed by cyber interactions from others who have been granted access by the individual. Further, the individual's public computer 260 can only be accessed through the individual's point of cyber access computer 200.

The architecture of the disclosed single-point-of-access cyber system 10 provides:

(a) a single interconnected cyber system for use by any individual for the cyber interactions and cyber activities;

(b) a system-wide set of standard cyber processes and cyber procedures;

(c) a cyber system which requires each individual, and each cyber device which uses the cyber system, to be properly identified;

(d) a remotely accessible point of cyber access computer for use by individuals who use the single-point-of-access cyber system; and (e) an individual with the ability to remotely access cyber assets and cyber resources.

(7) Universal Interactive Operating System

The universal interactive operating system is the primary operating system that is used by various components of the single-point-of-access cyber system.

The universal interactive operating system provides programming which in turn provides processes and procedures which in turn provide a cyber environment wherein cyber activities of every type can be integrated into one worldwide interconnected cyber system—a cyber system that uses the universal interactive operating system as a primary operating system.

The universal interactive operating system provides programming which in turn provides and enables the processes and procedures which in turn provide an individual with the ability to consolidate access to the individual's cyber activities into one remotely accessible device. This one remotely accessible device is the individual's point of cyber access computer.

The universal interactive operating system provides programming which in turn provides and enables the processes and procedures which in turn provide a cyber environment where cyber activities and cyber devices of every type can be accessed and used by an individual through the individual's use of an input output device in conjunction with the individual's use of the individual's point of cyber access computer.

The universal interactive operating system is designed to minimize the number of system-wide operational processes and procedures which are provided and used by others. This minimization of the number of system-wide operational processes and procedures is accomplished by providing and requiring the system-wide use of standard operational processes and procedures.

The universal interactive operating system may provide programming for device operating systems for:

(a) point of cyber access computers;
(b) private computers;
(c) public computers;
(d) input output devices;
(e) cyber telephone devices;
(f) cyber communications network devices; and
(g) any other single-point-of-access cyber system device which requires the use of an operating system.

The universal interactive operating system provides programming which in turn provides and enables the processes and procedures which in turn require and provide processes and procedures to assure that each individual is properly identified prior to each step the cyber interactions of that individual take through the single-point-of-access cyber system. The processes and procedures requiring identification further assure that each cyber device is properly identified prior to each step the cyber device's cyber interactions take through the single-point-of-access cyber system.

The universal interactive operating system provides programming which in turn provides and enables the processes and procedures which in turn provide an individual or a cyber device with the ability to establish identity, confirm identity, or provide verification of the identity of an individual, or of a cyber device.

The universal interactive operating system provides programming which in turn provides and enables the processes and procedures which in turn provide a cyber environment wherein each cyber device which is a part of the single-point-of-access cyber system properly identifies each individual and every other cyber device prior to having further cyber interactions with the properly identified individual or the properly identified cyber device.

The universal interactive operating system provides programming which in turn provides and enables the processes and procedures which in turn provide an individual's point of cyber access computer, or any cyber device, with the ability to establish the individual's identity.

The universal interactive operating system provides programming which in turn provides and enables the processes and procedures which in turn require and provide processes and procedures to assure that an individual's point of cyber access computer establishes the individual's identity prior to further cyber interactions between an input output device that is being used by the individual and the individual's point of cyber access computer.

The universal interactive operating system provides programming which in turn provides and enables the processes and procedures which in turn require and provide for an individual's point of cyber access computer to provide others and the cyber devices of others with verification of the individual's identity prior to each step that the individual's cyber interactions take through the single-point-of-access cyber system.

The universal interactive operating system provides programming which in turn provides and enables the processes and procedures which in turn require an individual's point of cyber access computer to establish the identity of the individual's device-based cyber assets, and for the individual's device-based cyber assets to establish the identity of the individual's point of cyber access computer prior to any further cyber interactions between the individual's point of cyber access computer and the individual's device-based cyber assets.

The universal interactive operating system provides programming which in turn provides and enables the processes and procedures which in turn provide an individual's point of cyber access computer with the ability to confirm the verified identity of others and the verified identity of the cyber devices of others prior to further cyber interactions with others or with the cyber devices of others.

The universal interactive operating system provides programming which in turn provides and enables the processes and procedures which in turn require and provide for devices within the cyber communications network to establish the identity of an individual's point of cyber access computer upon the individual's point of cyber access computer's first interaction with the cyber communications network.

The universal interactive operating system provides programming which in turn provides and enables the processes and procedures which in turn require the device within a cyber communications network which establishes the identity of an individual's point of cyber access computer to in turn provide verification of the identity of the individual's point of cyber access computer prior to each step the individual's cyber interactions take through the single-point-of-access cyber system.

The universal interactive operating system provides programming which in turn provides and enables the processes and procedures which in turn provide an input output device with the ability to observe identity information in regard to an individual, then transfer the identity information as a cyber interaction to the individual's point of cyber access computer where the cyber interaction containing identity information about the individual Can be used by the individual's point of cyber access computer to establish the individual's identity.

The universal interactive operating system provides programming which in turn provides and enables the processes and procedures which in turn provide an individual with the ability to use the single-point-of-access cyber system identification of an other, or the single-point-of-access cyber system identification of the device-based cyber assets of an other, to obtain additional information about the other or to obtain additional information about the other's device-based cyber assets.

The universal interactive operating system provides programming which in turn provides and enables the processes and procedures which in turn require and assure that each individual has one single-point-of-access cyber system identification.

The universal interactive operating system provides programming which in turn provides and enables the processes and procedures which in turn provides a cyber environment where there are no individuals who have more than one single-point-of-access cyber system identification and there are no cyber devices that have more than one single-point-of-access cyber system identification.

The universal interactive operating system provides programming which in turn provides and enables the processes and procedures which in turn provide operating-system-based cyber security functions and services for use throughout the single-point-of-access cyber system.

The universal interactive operating system provides programming which in turn provides and enables the processes and procedures which in turn require and provide processes for security for all inbound cyber interactions and cyber activities that have been sent to an individual's point of cyber access computer.

The universal interactive operating system provides programming which in turn provides and enables the processes and procedures which in turn require and provide processes for security for all internal cyber interactions and cyber activities within an individual's point of cyber access computer.

The universal interactive operating system provides programming which in turn provides and enables the processes and procedures which in turn require and provide processes for security for all outbound cyber interactions and cyber activities from an individual's point of cyber access computer.

The universal interactive operating system provides programming which in turn provides and enables the processes and procedures which in turn provide an individual with the ability to manage security at each of the individual's device-based cyber assets including, but not limited to the individual's point of cyber access computer, the individual's private computer, the individual's public computer, the individual's remote cyber devices, and the individual's cyber telephone system.

The universal interactive operating system provides programming which in turn provides and enables the processes and procedures which in turn provide differences among cyber operations, processes, codes, transfer packets, and formats for cyber interactions for: cyber telephone communications; cyber mail; cyber messages; cyber television; cyber video entertainment; cyber music; file transfers; computer programs; computer applications; operational controls; and any other needed or desired functions. The differences among cyber operations, processes, codes, transfer packets, and formats for cyber interactions provides for security between different processes, assures proper routing, and assures that a cyber interaction for one specific purpose cannot be used for a different purpose.

The universal interactive operating system provides programming which in turn provides and enables the processes and procedures which inspect inbound cyber interactions to determine if the inbound cyber interactions contain dangerous or malicious or inappropriate or unwanted content.

The universal interactive operating system provides programming which in turn provides and enables the processes and procedures which deny further access to inbound cyber interactions which contain dangerous or malicious or inappropriate or unwanted content.

The universal interactive operating system provides programming which in turn provides and enables the processes and procedures which in turn provide:

(a) safe and secure cyber interactions between the individual's private computer and the individual's point of cyber access computer;

(b) safe and secure cyber interactions between the individual's private computer and the individual's public computer;

(c) safe and secure cyber interactions between the individual's private computer and the individual's device-based cyber assets; and (d) safe and secure cyber interactions between the individual's private computer and the individual's cyber telephone system.

The universal interactive operating system provides programming which in turn provides and enables the processes and procedures which in turn require and provide processes for security for:

(a) interactions with an individual's device-based cyber assets;

(b) interactions with an individual's file-based cyber assets;

(c) interactions with an individual's cyber resources.

The universal interactive operating system provides programming which in turn provides and enables the processes and procedures which in turn provide for security-based administrative cyber interactions to occur between single-point-of-access cyber system devices as an integral part of a corresponding cyber interaction which is being transferred between the same two single-point-of-access cyber system devices.

The universal interactive operating system provides programming which in turn provides and enables the processes and procedures which in turn provide a system-wide protocol. The system-wide protocol requires others to have the ability to only request that an individual provide another individual with a requested cyber interaction. The system-wide protocol further requires that the individual either directly, or through automated interaction from the individual's cyber devices, have the exclusive ability to send other individuals cyber interactions from the individual, or from the individual's point of cyber access computer, or from the individual's public computer, or from the individual's cyber telephone system. No other individuals have the ability to send cyber interactions from the individual, or from the individual's point of cyber access computer, or from the individual's public computer, or from the individual's cyber telephone system.

The universal interactive operating system provides programming which in turn provides and enables the processes and procedures which in turn provides for the deletion of any cyber interaction which was from an individual or from a cyber device which cannot be properly identified.

The universal interactive operating system provides programming which in turn provides and enables the processes and procedures which in turn provide for the identification of, and the deletion of cyber interactions which contains dangerous, or malicious, or inappropriate, or unwanted, or improperly labeled or identified contents.

The universal interactive operating system provides programming which in turn provides and enables the processes and procedures that use (see FIG. 17) the combination of one or more virtual projectors 803, one or more virtual projection display screens 805, and one or more virtual recorders or capture devices 807 to provide cyber security by converting cyber content from cyber interactions which are not in universal interactive operating system standard image-based cyber content format to cyber interactions which are in universal interactive operating system standard image-based cyber content format.

The universal interactive operating system provides programming which in turn provides processes and procedures which provide encryption and other cyber security processes and cyber security procedures for use with any desired cyber interaction or cyber activity.

The universal interactive operating system provides programming which in turn provides and enables the processes and procedures which in turn provides encryption and other cyber security processes and cyber security procedures be used for cyber interactions which use radio frequency signals for cyber communication.

The universal interactive operating system provides programming which in turn provides and enables the processes and procedures for backing up stored information from, as well as restoring backed up information to:
  (a) an individual's point of cyber access computer;
  (b) an individual's private computer;
  (c) an individual's public computer;
  (d) an individual's cyber telephone system;
  (e) an individual's device-based cyber assets.

The universal interactive operating system provides programming which in turn provides and enables the processes and procedures for safe, secure, and private cyber financial interactions, cyber financial transactions, and the operation of cyber-based financial record keeping systems.

The universal interactive operating system provides programming which in turn provides and enables the processes and procedures which in turn provide safe, secure, and private cyber interactions between an individual through the individual's use of their own point of cyber access computer and any health care related cyber device or any health care related cyber resource which is being relied upon by the individual.

The universal interactive operating system provides programming which in turn provides and enables the processes and procedures which in turn provide the ability to use varying levels of security for access to, and operations of, different parts and the operation of the single-point-of-access cyber system.

The universal interactive operating system provides programming which in turn provides and enables the processes and procedures which in turn provide an individual with the ability to selectively grant or selectively deny cyber interactions from specified others, or cyber interactions from the specified cyber devices of specified others, access to the individual's point of cyber access computer, access to the individual's cyber telephone system, and access to the individual's public computer.

The universal interactive operating system provides programming which in turn provides and enables the processes and procedures which in turn provide an individual with the ability to make copies of the individual's file-based cyber assets available for specified others as cyber resources. Cyber resources are made available to specified others through the individual's public computer.

The universal interactive operating system provides programming which in turn provides and enables the processes and procedures that provide an individual with the ability to selectively grant or selectively deny cyber interactions from specified others, or cyber interactions from the cyber devices of specified others, access to all or any part of the cyber resources which have been made available for specified others through the specified other's use of the individual's public computer.

The universal interactive operating system provides programming which in turn provides and enables the processes and procedures that provide an individual with the ability to safely and securely provide specified others specified levels of administrative control, or specified levels of access control, or specified levels of operational access control of all, or any part of, the individual's point of cyber access computer, the individual's private computer, the individual's public computer, the individual's device-based cyber assets, the individual's file-based cyber assets, or the individual's cyber telephone system.

The universal interactive operating system provides programming which in turn provides and enables the processes and procedures which in turn provide an individual with the ability to provide specified others with specified cyber resources, specified cyber content, and specified cyber services of any type.

The universal interactive operating system provides programming which in turn provides and enables the processes and procedures that convert cyber interaction output from cyber devices that do use the universal interactive operating system to cyber interaction output that interacts seamlessly with the operating systems of cyber devices that do not use the universal interactive operating system component of the disclosed single-point-of-access cyber system.

The universal interactive operating system provides programming which in turn provides and enables the processes and procedures that convert cyber interaction output from cyber devices which do not use the universal interactive operating system to cyber interaction output that interacts seamlessly with cyber devices that do use the universal interactive operating system component of the disclosed single-point-of-access cyber system.

The universal interactive operating system provides programming which in turn provides and enables the processes and procedures which in turn provide interoperability processes to convert cyber content that is not in a format that can directly be used by the single-point-of-access cyber system to cyber content that is in the standard universal interactive operating system format.

The universal interactive operating system provides programming which in turn provides and enables the processes and procedures which in turn provide interoperability processes that convert cyber content that is in a standard universal interactive operating system format to cyber content that is in a format which can be used by a cyber device using an operating system other than the universal interactive operating portion of the disclosed embodiment. The combination of this and the previous three processes and procedures immediately above is the reason the interactive operating system is described as being universal.

The universal interactive operation system provides programming which in turn provides and enables the processes and procedures which in turn provide an environment of cyber interoperability. The environment of cyber interoperability provides an individual with the ability to utilize the single-point-of-access cyber system to access and interact with any available cyber device or any available cyber content.

The universal interactive operating system provides programming which in turn provides and enables the processes and procedures that use (see FIG. 17) one or more virtual projectors 803, one or more virtual projection display screens 805, and one or more virtual recorders or capture devices 807 to convert inbound image-based cyber content that cannot be used by the universal interactive operating system standard image-based cyber content format to image-based cyber content that can be used by the universal interactive operating system standard image-based cyber content format.

The universal interactive operating system provides programming which in turn provides and enables the processes and procedures that provide for safe and secure cyber interactions with content and device interoperability conversion processes.

The universal interactive operating system provides programming which in turn provides and enables the processes and procedures that provide for safe and secure cyber interactions with output from content and device interoperability conversion processes.

The universal interactive operating system provides programming which in turn provides and enables the processes and procedures that convert administrative cyber interactions and systems configuration cyber interactions between cyber devices, to and from system-standard universal interactive operating system format.

The universal interactive operating system provides programming which in turn provides and enables the processes and procedures that identify inbound or outbound cyber interactions that require content or device interoperability conversion.

The universal interactive operating system provides programming which in turn provides and enables the processes and procedures that provide an individual with the ability to use operating systems other than the universal interactive operating system which is a part of the single-point-of-access cyber system of the disclosed embodiment. The individual may require the use of an operating system other than the universal interactive operation system of the disclosed embodiment for the purpose of converting cyber content and cyber interactions that can be used by operating systems other than the universal interactive operating system, to cyber content and cyber interactions that can be used by the universal interactive operating system. Further, the individual may require the use of an operating system other than the universal interactive operating system for the purpose of using computer programs or computer applications that require the use of an operating system other than the universal interactive operating system.

The universal interactive operating system provides programming which in turn provides and enables the processes and procedures that exclude others, and the cyber devices of others, from gaining operational control, or administrative control, or access control of an individual's point of cyber access computer, or the individual's private computer, or the individual's device-based cyber assets.

The universal interactive operating system provides programming which in turn provides and enables the processes and procedures that exclude others, and the cyber devices of others, from gaining administrative control, or access control of an individual's public computer, or of the individual's cyber telephone system.

The universal interactive operating system provides programming which in turn provides and enables the processes and procedures that provide for the use of outbound cyber interactions that have been pre-processed by the sender. The pre-processed cyber interactions of the sender are ready to be used by a thin input output device with no further content processing required.

The universal interactive operating system provides programming which in turn provides and enables the processes and procedures which in turn provide for a sender to pre-process outbound cyber interactions so that the outbound cyber interactions are ready to be used by a thin input output device with no further content processing required.

The universal interactive operating system provides programming which in turn provides and enables the processes and procedures which in turn provide for cyber interactions that are sent from an individual's point of cyber access computer to the thin input output device that is being used by the individual to be pre-processed cyber interactions which require no further processing of content prior to use by the individual at the thin input output device.

The universal interactive operating system provides programming which in turn provides and enables the processes and procedures providing for the use of single-point-of-access cyber system addresses and single-point-of-access cyber system identifications at each step of each cyber interaction.

The universal interactive operating system provides programming which in turn provides and enables the processes and procedures that provide an individual with the ability to request or require that others only provide the individual with cyber interactions and cyber content that comply with all of the individual's preferences or requirements for cyber interactions and for cyber content.

The universal interactive operating system provides programming which in turn provides and enables the processes and procedures that provide an individual with the ability to request, or require others, provide the individual with varying levels of privacy, as defined by the individual, for the individual's cyber interactions with others.

The universal interactive operating system provides programming which in turn provides and enables the processes and procedures that provide an individual with the ability to add cyber components and cyber devices to the single-point-of-access cyber system, to remove cyber components and cyber devices from the single-point-of-access cyber system, and to change the configuration of the cyber components and the cyber devices of the single-point-of-access cyber system.

The universal interactive operating system provides programming which in turn provides and enables the processes and procedures that provide an individual with the ability to:
 (a) add processes and/or procedures to the single-point-of-access cyber system;
 (b) remove processes and/or procedures from the single-point-of-access cyber system;
 (c) change the configuration of the processes, and/or the procedures of the single-point-of-access cyber system.

The universal interactive operating system provides programming which in turn provides and enables the processes and procedures that provide an individual with the ability to:
 (a) add cyber processes, and/or cyber procedures, and/or components to a cyber device;

(b) remove cyber processes, and/or cyber procedures, and/or components from a cyber device;

(c) change the configuration of the cyber processes, and/or the cyber procedures, and/or the components of a cyber device.

The universal interactive operating system provides programming which in turn provides and enables the processes and procedures that allow an individual's single-point-of-access cyber system cyber devices, cyber components, cyber processes, and cyber procedures to be configured in any way. Providing an individual with the ability to configure in any way the individual's single point-of-access cyber system cyber devices, cyber components, cyber processes, and cyber procedures provides for the varying needs and desires of different and unique individuals. Further, individuals that are entities such as businesses, or schools, or governments, or any other type of entity which uses a single-point-of-access cyber system identification, can have many different and specific needs for single-point-of-access cyber system cyber devices, cyber components, cyber processes, cyber procedures, and cyber system configurations.

The universal interactive operating system provides programming which in turn provides and enables the interoperability cyber processes and cyber procedures that provide an individual with the ability to seamlessly use any non-system-standard cyber activity, or any non-system-standard cyber process, or any non-system-standard cyber device which the individual may require or desire.

The universal interactive operating system provides programming which in turn provides and enables the processes and procedures that provide for the interrelationship between the cyber components, the cyber devices, the cyber processes, and the cyber procedures of the single-point-of-access cyber system.

The universal interactive operating system provides programming which in turn provides and enables the processes and procedures that provide for cyber interactions between the cyber components, the cyber devices, the cyber processes, and the cyber procedures of the single-point-of-access cyber system.

The universal interactive operating system provides programming which in turn provides and enables the processes and procedures that provide an individual, through the individual's use of an input output device, with a perceptible output. This perceptible output is the result of the individual's interaction with the input output device.

The universal interactive operating system provides programming which in turn provides and enables the processes and procedures that provide an individual with operational access to the individual's point of cyber access computer from any remote input output device which can provide adequate information to the individual's point of cyber access computer to allow the individual's point of cyber access computer to establish the individual's identity.

The universal interactive operating system provides programming which in turn provides and enables the processes and procedures which provide seamless cyber interactions when an input output device is simultaneously used for two or more different cyber activities.

The universal interactive operating system provides programming which in turn provides and enables the processes and procedures which provide for cyber interactions with input devices of any type and output devices of any type.

The universal interactive operating system provides programming which in turn provides and enables the processes and procedures which provide a graphic user interface using frames and scrolls formatted image-based cyber content in conjunction with the processes which use one or more virtual projectors, one or more virtual projection display screens, and one or more virtual recorders or capture devices for conversion of, alteration of, or convergence of image-based cyber content.

The universal interactive operating system provides programming which in turn provides and enables the processes, procedures, and programming which makes up the device operating system for a point of cyber access computer.

The universal interactive operating system provides programming which in turn provides and enables the processes and procedures which enable a point of cyber access computer to include a separate private computer and to also include a separate public computer; the separate private computer and separate public computers may both be an integral part of the point of cyber access computer.

The universal interactive operating system provides programming which in turn provides and enables the processes and procedures which provide a cyber system which routes and transfers cyber interactions and cyber activities within a point of cyber access computer.

The universal interactive operating system provides programming which in turn provides and enables the processes and procedures which provide an individual with the ability to use any input output device for cyber interactions with the individual's point of cyber access computer.

The universal interactive operating system provides programming which in turn provides and enables the processes and procedures which provide an individual's point of cyber access computer with the ability to independently have cyber interactions with others based on predetermined operational settings, predetermined administrative settings, and predetermined access settings which were provided to the individual's point of cyber access computer by the individual The universal interactive operating system provides programming which in turn provides and enables the processes, procedures, and programming which makes up the device operating system for a private computer.

The universal interactive operating system provides programming which in turn provides and enables the processes and procedures which provide an individual with a private computer which can only be accessed by the individual or the individual's device-based cyber assets.

The universal interactive operating system provides programming which in turn provides and enables the processes and procedures which exclude all others, as well as the cyber devices of all others, from having cyber interactions with an individual's private computer. Because all others and the cyber devices of all others are excluded from having cyber interactions with the individual's private computer, the individual's private computer provides the individual with a cyber environment which is absolutely safe, secure, private, and free from intrusion by others as described above. The individual's private computer can also be considered to be a cyber vault.

The universal interactive operating system provides programming which in turn provides and enables the processes and procedures which provide safe and secure cyber interactions between an individual's private computer and all cyber activities and all cyber interactions from within the individual's point of cyber access computer.

The universal interactive operating system provides programming which in turn provides and enables the processes and procedures which provide an individual with the ability to use the individual's private computer to run and use computer programs and to run and use computer applications.

The universal interactive operating system provides programming which in turn provides and enables the processes and procedures which provide an individual with the ability to store, access, use, and manage a lifelong collection of file-based cyber assets from within the individual's private computer.

The universal interactive operating system provides programming which in turn provides and enables the processes, procedures, and programming which makes up the device operating system for a public computer.

The universal interactive operating system provides programming which in turn provides and enables the processes and procedures which provide processes for an individual's public computer to use to independently have cyber interactions with others based on predetermined operational settings, predetermined administrative settings, and predetermined access settings which were provided for the individual's public computer by the individual.

The universal interactive operating system provides programming which in turn provides and enables the processes and procedures for an individual to use to receive and to store cyber interactions and cyber content from others through use of the storage capabilities of the individual's public computer.

The universal interactive operating system provides programming which in turn provides and enables the processes and procedures which provide an individual with the ability to selectively grant or to selectively deny others or the cyber devices of others access to the individual's public computer.

The universal interactive operating system provides programming which in turn provides and enables the processes and procedures which provide an individual with the ability to selectively grant or to selectively deny specified others or the specified cyber devices of specified others access to all or any part of the individual's cyber resources which are available for specified others through the individual's public computer.

The universal interactive operating system provides programming which in turn provides and enables the processes and procedures which provide for all aspects of operations of and interaction with a safe, a secure, and a full-featured cyber telephone system.

The universal interactive operating system provides programming which in turn provides and enables the processes and procedures which provide an individual's cyber telephone system with the ability to independently interact with others based on predetermined operational settings, predetermined administrative settings, and predetermined access settings which were provided for the individual's cyber telephone system by the individual.

The universal interactive operating system provides programming which in turn provides and enables the processes and procedures for all aspects of operations of and for cyber interactions with a safe, a secure, and a full-featured cyber asset manager.

The universal interactive operating system provides programming which in turn provides and enables the processes and procedures which exclude an individual's device-based cyber assets from having cyber interactions with others.

The universal interactive operating system provides programming which in turn provides and enables the processes and procedures which exclude all others from having cyber interactions with any specific individual's device-based cyber assets.

The universal interactive operating system provides programming which in turn provides and enables the processes and procedures which provide an interoperable cyber environment wherein interconnected cyber devices of any type can be seamlessly used as a component of the single-point-of-access cyber system.

The universal interactive operating system provides programming which in turn provides and enables the processes and procedures which provide a system-wide standard interconnected interactive interface for use with any cyber device.

The universal interactive operating system provides programming which in turn provides and enables the processes and procedures which provide for:

(a) use of multiple lines of cyber communications;

(b) use of multiple types of lines of cyber communications;

(c) use of multiple providers of lines of cyber communications.

The universal interactive operating system provides programming which in turn provides and enables the processes and procedures which require and provide for all devices within the cyber communications network to exclude all from interacting with cyber interactions while the cyber interactions are being transferred through the cyber communications network.

The universal interactive operating system provides programming which in turn provides and enables the processes and procedures which provides for each separate cyber interaction to use a separate line of cyber communications whereby no two cyber interactions may use the same line of cyber communications at the same time.

The universal interactive operating system provides programming which in turn provides and enables the processes and procedures which provides for a sender's cyber interactions to move one way only through a cyber communications line and for the recipient's cyber interactions to move one way only and to be sent through a separate cyber communications line.

The universal interactive operating system provides programming which in turn provides and enables the processes and procedures which provide safe and secure cyber interactions from a cyber device which are sent to and through an input output device which is being used by an individual and to the individual's point of cyber access computer. Further, the universal interactive operating system provides and enables the programming which provides processes and procedures which provide safe and secure cyber interactions from an individual's point of cyber access computer, through an input output device that is being used by the individual, to a cyber device.

The universal interactive operating system provides programming which in turn provides and enables the processes and procedures which route and transfer cyber interactions through the cyber communications network.

The universal interactive operating system provides programming which in turn provides and enables the processes and procedures which provide for all operations of the universal interactive operating system's safe, secure, and full-featured transfer packet system.

The universal interactive operating system provides programming which in turn provides and enables the processes and procedures which require and provide for the use of transfer packet labels. The transfer packet labels are used for the purposes of: security; identification; routing; communicating a sender's requirements or requests; or any other required or desired utility which can be provided by information from a transfer packet label.

The universal interactive operating system provides programming which in turn provides and enables the processes and procedures which compare a transfer packet's label to the contents of the transfer packet.

The universal interactive operating system provides programming which in turn provides and enables the processes and procedures which provide for safe and secure deletion of transfer packets which have packet contents that do not match the transfer packet's label.

The universal interactive operating system provides programming which in turn provides and enables the processes and procedures which provide for safe and secure use of mobile or in-motion cyber devices such as a vehicle or a cyber telephone device.

The universal interactive operating system provides programming which in turn provides and enables the processes and procedures which provide and make use of single-point-of-access cyber system addresses for mobile or in-motion cyber devices.

The universal interactive operating system provides programming which in turn provides and enables the processes and procedures which provide for use of the cyber communications network by mobile or in-motion cyber devices.

The universal interactive operating system provides programming which in turn provides and enables the processes and procedures which provide for the use of a global position locating device either independently or in conjunction with a cyber device.

The universal interactive operating system provides programming which in turn provides and enables the processes and procedures which provide menus, or any other user-perceptible output which provides an individual with knowledge of and access to cyber interactions with cyber activities or cyber content.

The universal interactive operating system provides programming which in turn provides and enables the processes and procedures which provide for a voice recognition-driven user interface.

The universal interactive operating system provides programming which in turn provides and enables the processes and procedures which provide an individual with the ability to store, to access, to modify, to use, and to manage file-based cyber assets and file-based cyber resources.

The universal interactive operating system provides programming which in turn provides and enables the processes and procedures which provide an individual with the ability to store, to access, to modify, to use, and to manage a lifelong collection of the individual's file-based cyber assets.

The universal interactive operating system provides programming which in turn provides and enables the processes and procedures which provide an individual with an absolutely safe and secure location for storage, for access, for modifying, for use, and for management of a lifelong collection of the individual's file-based cyber assets.

The universal interactive operating system provides programming which in turn provides and enables the processes and procedures which provide a history of an individual's cyber activities as well as a history of the individual's device-based cyber asset's cyber activities.

The universal interactive operating system provides programming which in turn provides and enables the processes and procedures which use a combination of one or more virtual projectors, one or more virtual projection display screens, and one or more virtual recorders or capture devices to converge a plurality of sources of image-based cyber content into one or more converged sources of interactive image-based cyber content.

The universal interactive operating system provides programming which in turn provides and enables the processes and procedures which use a combination of one or more virtual projectors, one or more virtual projection display screens, and one or more virtual recorders or capture devices to alter any aspect of image-based cyber content in any way.

The universal interactive operating system provides programming which in turn provides and enables the universal interactive operating system set of standard cyber processes and standard cyber procedures for use, management, and alteration of image-based cyber content.

The universal interactive operating system provides programming which in turn provides and enables the processes and procedures which provide for creation and use of frames and scrolls formatted image-based cyber content.

The universal interactive operating system provides programming which in turn provides and enables the processes and procedures which provide for frames and scrolls formatted image-based cyber content to use the total pixel width by total pixel height size of the target image output device to determine the total pixel width by a total pixel height size of an image which is to be transferred to the image output device.

The universal interactive operating system provides programming which in turn provides and enables the processes and procedures which provide for and enable the use of image-based cyber content which has both a total pixel width and a total pixel height which are smaller than or equal to the pixel width and the pixel height of the target image display device. Such content is considered to be a cyber image in frame format as shown in FIGS. 18B and 18C.

The universal interactive operating system provides programming which in turn provides and enables the processes and procedures which provide for and enable the use of image-based cyber content which has a total pixel width which is greater than the pixel width of the target image display device and/or a total pixel height which is greater than that of the pixel height of the target image display device. Such content is considered to be a scroll formatted cyber image as shown in FIGS. 18E and 18G.

The frames and scrolls format for image-based cyber content provides an individual with the ability to scroll through a scroll formatted cyber image so that an entire scroll formatted cyber image may be displayed, although not simultaneously.

Figure 16D:
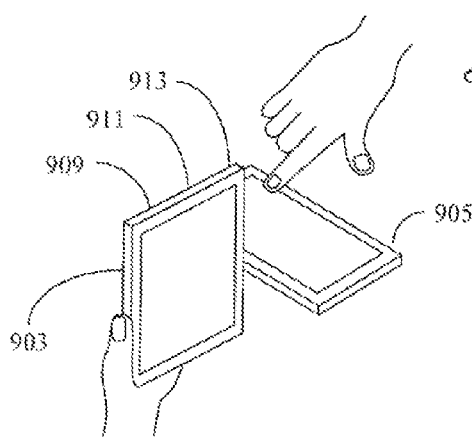
Figure 16E:
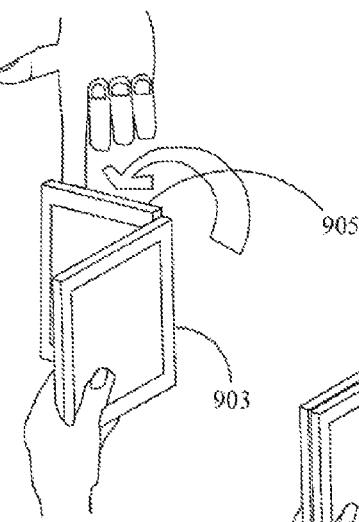
Figure 16F:
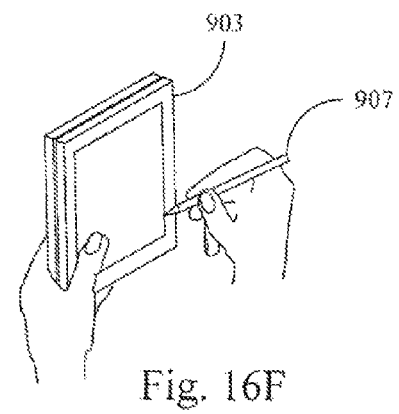

Further, the frames and scrolls format for image-based cyber content uses a pixel width by pixel height grid to identify the point on a frames or scrolls formatted cyber image where an input interaction was made by an individual as shown in FIGS. 16C and 16F.

The universal interactive operating system provides programming which in turn provides and enables the processes and procedures which provide for all aspects of operations and use of a safe, secure, and full-featured cyber license system.

In the single-point-of-access cyber system license system which is enabled by the universal interactive operating system a licensee is required to provide the licensor with:

(a) the licensee's single-point-of-access cyber system identification;

(b) the licensee's single-point-of-access cyber system address;

(c) the identification of the licensed cyber resource; and
(d) the rights the licensee has to the licensed cyber resource.

The universal interactive operating system provides programming which in turn provides and enables the processes and procedures which provide for all aspects of operations and use of a safe, secure, and full-featured cyber mail system.

The universal interactive operating system provides programming which in turn provides and enables the processes and procedures which provide for all aspects of operations and use of a safe, secure, and full-featured cyber message and/or cyber alert system.

The universal interactive operating system provides programming which in turn provides and enables the processes and procedures which provide for all aspects of operations and use of a safe, secure, and full-featured cyber site system.

The universal interactive operating system provides programming which in turn provides and enables the processes and procedures which provide a sender with the option to receive a cyber acknowledgement of the recipient's receipt of a cyber interaction.

The universal interactive operating system provides programming which in turn provides and enables the processes and procedures which provide system generated cyber messages when cyber activities do not execute properly.

The universal interactive operating system provides programming which in turn provides and enables the processes and procedures which provide an individual with the ability to send to themselves, or to others, system-generated cyber messages or system-generated cyber alerts based on any parameter the individual designates.

The universal interactive operating system provides programming which in turn provides and enables the processes and procedures which provide safe, secure, and private interaction between any health care related cyber device or any cyber health care related resource that is being used or relied upon by the individual, and/or the individual's private computer, and/or the individual's point of cyber access computer.

The universal interactive operating system provides programming which in turn provides and enables the processes and procedures which provide job management for the operations of the universal interactive operating system as well as task management for the operations of the universal interactive operating system.

The universal interactive operating system provides programming which in turn provides and enables the processes and procedures which provide management for cyber devices.

The universal interactive operating system provides programming which provides and enables the processes and procedures which provide for the accurate and reliable identification of any one specific and unique individual through use of any combination of facial recognition, voice recognition, and facial movement.

(8) Cyber Communications Network

The purpose of the cyber communications network 300 (see FIGS. 2-15) is to safely, securely, and efficiently transfer properly formatted and properly identified transfer packets from a properly identified sender to a properly identified recipient.

Transfer packets are the only single-point-of-access cyber system vehicles which are used to move cyber interactions from a sender to a recipient.

The single-point-of-access cyber system uses many different and unique transfer packet formats. The different and unique transfer packet formats are used for different types of cyber activities as well as for cyber activities which are for different purposes.

A point of cyber access computer uses differences in transfer packet formats to aid in providing security for all inbound cyber activities. The point of cyber access computer also uses differences in transfer packet formats to aid in the proper routing of cyber activities and cyber interactions.

The packet portion of a transfer packet contains all, or a part of, a sender's cyber interaction.

A sender's cyber interaction may require one or more transfer packets. A cyber interaction which requires more than one transfer packet has transfer packets which are identified as being a specific sequential part of a group of transfer packets.

Each transfer packet, at a minimum, has a label which provides:
(a) the single-point-of-access cyber system address of the recipient's point of cyber access computer;
(b) the recipient's single-point-of-access cyber system identification;
(c) the sender's single-point-of-access cyber system identification;
(d) verification of the sender's identity;
(e) the single-point-of-access cyber system identification of the sender's point of cyber access computer;
(f) the single-point-of-access cyber system address of the sender's point of cyber access computer;
(g) verification of the identity of the sender's point of cyber access computer;
(h) information about the contents of the transfer packet regarding if the transfer packet is one in a connected series of transfer packets that together, in proper sequence, make up one single cyber interaction from a sender;
(i) information about the contents of a transfer packet which aid the recipient in determining if the sender's cyber interaction conforms with the recipient's requirements or preferences for privacy and the recipient's requirements or preferences for cyber interaction content;
(j) history of every cyber interaction that the transfer packet has with a single-point-of-access cyber system cyber device.

A transfer packet label can include any information about the sender or any information about the contents of the transfer packet which was required or desired by the sender or the recipient of the cyber transfer packet.

Recipients of transfer packets can require that transfer packets include additional label information which can include any information about the sender or about the contents of the transfer packet which may aid the recipient in determining if the sender's cyber interaction will be allowed to gain access to the recipient's point of cyber access computer.

An example of a recipient's requirements for additional transfer packet label information about the sender or about the contents of a transfer packet would occur if a recipient required all senders to identify the sender as a business. The recipient may further require cyber interactions from a business to identify if the business was making an unsolicited marketing cyber interaction. In such case the recipient has the ability to exclude all unsolicited businesses marketing cyber interactions from gaining access to the recipient's point of cyber access computer.

The cyber communications network (see FIG. 15), requires that each individual be properly identified prior to each step the individual's cyber interactions take through the cyber communications network. Further, the cyber communications network requires that each cyber device be properly identified prior to each step the cyber device's cyber interactions take through the cyber communications network. Cyber interactions from improperly or inadequately identified individuals or improperly or inadequately identified cyber devices cannot be transferred through the cyber communications network.

The cyber devices which make up the cyber communications network do not have the ability to make changes to transfer packet labels or the ability to use or alter the contents of transfer packets.

A recipient has the ability to keep a complete history of transfer packet label information from any or all of the inbound cyber interactions which are received by the recipient. The recipient also has the ability to keep a history of transfer packet label information from any or all inbound cyber interactions which are denied access to the recipient's point of cyber access computer.

Communications between the devices within the cyber communications network can use wire, or optical fiber, or radio frequency, or any other means which provides adequate utility, or any combination thereof. When radio frequency is used for cyber communications, the single-point-of-access cyber system uses encryption, or any other cyber security process which makes the contents of a transfer packet useless to all but the sender and the recipient.

The devices in the cyber communications network (see FIG. 15), the input output devices, the point of cyber access computers, and remote device-based cyber assets may each provide separate security-based administrative cyber interactions as an integral part of a corresponding cyber interaction which is being transferred between the same two single-point-of-access cyber system cyber devices. This process prevents intruders from interacting with transfer packets and the operations of the cyber communications network.

Each device in the cyber communications network may keep a history of its own cyber activities and cyber interactions.

The device within the cyber communications network which comes in first contact with cyber interactions from an individual's point of cyber access computer establishes the identity of the individual's point of cyber access computer prior to the transfer of the individual's cyber interaction. The devices within the cyber communications network which come in first contact with the individual's point of cyber access computer can use any safe, secure, and accurate process or method to establish the identity of the individual's point of cyber access computer.

After having properly established the identity of an individual's point of cyber access computer, the device within the cyber communications network which comes in first contact with cyber interactions from the individual provides verification of the identity of the individual's point of cyber access computer prior to each step the individual's cyber interactions take through the single-point-of-access cyber system.

(9) Input Output Device

The purpose of the input output device 100 (referring again to FIG. 1) in the disclosed single-point-of-access cyber system is to:

(a) send input from an individual using the input output device through the cyber communications network to the individual's computer;

(b) receive output for the individual which was sent from the individual's computer through the cyber communications network to the input output device which is being used by the individual; and (c) provide output which provides the individual with the ability to perceive the cyber interaction which was sent to the input output device through the cyber communications network from the individual's computer.

As shown in FIG. 1, the input output device 100 uses the cyber communications network 300 to move transfer packets between the input output device that is being used by an individual and the individual's computer.

The input output device 100 uses an operating system which provides functional and operational programming for the functions of the input output device.

One type of input output device is a thin input output device 100 which has limited processing capabilities. A thin input output device relies on another device to have previously processed the content of the interaction so that the interaction can be used by the thin input output device with no further processing of content.

As a part of its operations, one type of input output device 100 has the ability to store its operating system as well as store any cyber interactions which are required to be stored.

An input output device 100 may also be a cyber telephone device. When an input output device is also a cyber telephone device, an individual's point of cyber access computer 200 can initiate cyber telephone communication cyber interactions with the individual at the individual's input output/cyber telephone device. When an individual is using an input output device that is not a cyber telephone device, the individual would need to initiate the cyber telephone communication process, Cyber interaction from an individual to the individual's computer must originate from an input output device 100. The input output device 100 can provide the individual's computer with information which allows the individual's computer to establish the individual's identity. As previously indicated, proper identification of the individual prior to any further cyber interactions with the same individual is a tenet of the present embodiment.

Sending a cyber interaction from an individual using the input output device to the individual's computer requires the individual use properly formatted transfer packets. The properly formatted transfer packets are addressed to the individual as the recipient. The address contains the individual's single-point-of-access cyber system identification as well as the single-point-of-access cyber system address and the identification of the individual's computer.

Sending a cyber interaction from an individual's computer to an input output device which is being used by the individual requires that the individual's computer send input output device formatted transfer packets. The input output device formatted transfer packets are addressed to the single-point-of-access cyber system identification and address of the input output device which is being used by the individual.

Upon first contact with the individual's point of cyber access computer, the individual's cyber interaction's request for access will be routed to the processes and procedures for granting the individual's cyber interactions access to the individual's point of cyber access computer.

Following an individual's request for the individual's cyber interaction to gain access to the individual's own point of cyber access computer there will be the execution of process and procedures for establishing the identity of this specific individual. The cyber interactions from the individual who is using the input output device will only be granted access to the individual's own point of cyber access computer after the individual's own point of cyber access computer accurately establishes the individual's identity.

An individual's point of cyber access computer, working in conjunction with the input output device that is being used by the individual, can use facial recognition, or voice recognition, or facial movement when speaking, or a password, or a retinal scan, or a token, or any other suitable method of identification known to those of ordinary skill in the art, or any combination thereof, to remotely establish the individual's identity.

Once cyber interactions from the individual gain access to the individual's point of cyber access computer, the cyber interactions from the individual will be routed to the individual's private computer. It is at the individual's private computer where the individual, through the individual's interactions with the input output device, has operational and administrative access to the individual's private computer, the individual's point of cyber access computer, the individual's public computer, the individual's cyber assets, the cyber resources, and the individual's cyber telephone system.

Only cyber interactions from the individual can gain access to the individual's private computer 230 (see FIGS. 2-12). All cyber interactions from all others are excluded from access of any kind to the individual's private computer.

Once the individual through the individual's interactions with the input output device has gained access to the individual's private computer 230, the individual may be provided with options for further cyber interactions.

Referring again to FIG. 3, an individual using the input output device 100 sends cyber interactions through the cyber communications network to the individual's private computer 230. In turn, the individual's private computer 230 processes the individual's cyber interaction. The cyber interaction to be processed by the individual's private computer 230 can include any cyber activity which is available for use by the individual through the individual's point of cyber access computer 200, the individual's public computer 260, the individual's cyber assets, the individual's cyber resources, or the cyber telephone system.

Cyber interactions with cyber activities, cyber interactions with cyber devices, and cyber interactions with cyber content which is available for use by the individual through the individual's private computer 230 may include: the individual's computer programs and applications; the individual's cyber telephone system; the individual's cyber asset manager; the individual's home automation system and its resources; the individual's vehicle; the individual's owned copies of cyber television, cyber video entertainment, and cyber music; the individual's cyber assets including cyber activity history, personal financial information, personal health information, photographs, or any other cyber activities or cyber devices or cyber content; and, access to the cyber resources of others which are available for the individual's use including books, magazines, newspapers, libraries, the cyber educational system, cyber services, the cyber health system, or any other cyber resource.

As a result of an individual's cyber interactions, the individual's private computer 230, or the individual's point of cyber access computer 200, or the individual's public computer 260, can respond to the individual by sending cyber interactions through the cyber communications network to the input output device 100 which is being used by the individual.

As an example, an individual can be typing on a keyboard which appears on the screen of the input output device while looking at the image on the image display screen of the input output device. When the individual inputs the letter "k" to the keyboard appearing on the screen of the input output device 100, and the individual communicates the individual's input of the letter "k" to the individual's remote point of cyber access computer 200, the individual's point of cyber access computer 200 will, in turn, respond to the input output device 100 which the individual is using. This response will provide an image which represents the changes to the prior image which were the results of the individual's prior cyber interactions.

Another example would be that the individual at the input output device 100 interacts with an image on the display screen of the input output device 100. The image appearing on the screen of the input output device provides the individual with choices for cyber interactions which are for labeled or otherwise identified purposes. The individual interacts with the image appearing on the display screen of the input output device 100, and the individual communicates the interaction to the individual's remote computer. The individual's computer in turn processes the individual's cyber interaction and responds by providing the input output device 100 which the individual is using with a new image and associated links. The new image and associated links are the result of the individual's computer's processing of the individual's prior cyber interaction.

Yet another example would be that instead of a physical interaction with the display screen on the input output device, the individual speaks certain words, such as the instructions to open the garage door, into the input output device 100. The input output device 100 communicates the individual's voice command cyber interaction to the individual's computer. In turn the individual's computer operates the individual's garage door opener. The individual's computer may or may not notify the individual at the input output device of the status of the opening of the garage door depending on the previously established preferences of the individual.

An individual's computer may have the ability to remotely alter the functional and operational settings of the input output device 100 which is being used by the individual.

One possible result of an individual's cyber interactions with the individual's computer can be that the individual's computer responds in part or in whole to the cyber interactions by providing cyber interactions which alter the functional and operational settings of the input output device 100 which is being used by the individual.

Alterations to the functional and operational settings of the input output device 100 can be requested by the input output device 100, or by the individual through the individual's interactions with the input output device 100, or by the individual's computer, or by any cyber device, or by any cyber file.

The input output device 100 has the ability to return to predetermined functional and operational settings upon request, or upon completion of a cyber interaction which requested or required the altered functional and operational settings for the input output device.

An individual's computer and an input output device 100 can each establish an interconnection with the cyber communications network. This cyber communications network interconnection can be an interconnection ranging from a momentary single line cyber communications network interconnection to continuous multiple line cyber communications network interconnections.

Cyber interaction between an input output device 100 and the individual's point of cyber access computer 200 which are transferred using the cyber communications network can simultaneously include one or more instances of cyber interactions between:

(a) the individual's cyber assets and the individual's cyber asset manager;

(b) the individual using the input output device 100 and the individual's point of cyber access computer 200;

(c) a cyber resource and the individual's public computer 260;

(d) the individual's private computer 230 and the individual at the input output device 100;

(e) the individual's point of cyber access computer 200 and a cyber device;

(f) the individual's private computer 230 and a cyber asset; and (g) the individual's public computer 260 and a cyber resource.

The input output device 100 can be used as a cyber communications network link between device-based cyber assets or device-based cyber resources and an individual's computer.

The input output device 100 can use one or more lines of cyber communication. These lines of cyber communication can be between an input output device 100 and an individual's computer, or between an input output device 100 and any device-based cyber asset or cyber resource.

A thin input output device 100 operations are limited to processing only functional and operational programming. Therefore, the thin input output device 100 only runs the programming that is required for the operations of the thin input output device itself. When working in conjunction with a thin input output device, an individual's computer must provide all required processing, management, and support for every interaction that is sent to the thin input output.

All cyber interactions from an individual's computer to the input output device 100 the individual is using are to be pre-processed and made ready for use by the input output device prior to being sent through the cyber communications network, The input output device 100 may, upon first cyber interaction with an individual's computer, provide the individual's computer with information about the display screen size, the type of the input output device's display screen, as well as information about the operational capabilities and the operational settings of the input output device 100.

An input output device's components may include:
(a) one single-point-of-access cyber system identification;
(b) one single-point-of-access cyber system address;
(c) one or more devices which provide operations for transferring cyber transfer packets over a cyber communications network;
(d) interconnecting circuits;
(e) one or more sources of power;
(f) a protective housing;
and may also include one or more of the following:
(g) an image display;
(h) an audio output device 909;
(i) a camera 911;
(j) a microphone 913;
(k) a manual input device;
(l) a cyber storage device;
(m) an auxiliary input for interaction with other cyber devices; and
(n) an auxiliary output for interaction with other cyber devices.

The universal interactive operating system provides the needed operating system programming to provide the input output device 100 with the ability to be used as a single-point-of-access cyber system input output device.

The universal interactive operating system provides the needed programming which provides for the interoperable use of the input output device 100 as an input output device 100 which may have cyber interactions with cyber devices which do not use the universal interactive operating system.

The universal interactive operating system provides the needed programming which provides an individual with the ability to alter the operational configuration of the input output device 100 on a temporary or permanent basis.

The universal interactive operating system provides the needed programming which provides an input output device's single-point-of-access cyber system identification to the first device in the cyber communications network with which the input output device 100 has cyber interactions.

The universal interactive operating system provides the programming that provides the input output device with the ability to provide all necessary cyber communications functions including use of properly formatted transfer packets for interactions with any type of cyber devices.

The input output device 100 can be an integral part of a computer; or, the input output device 100 can be directly connected to a computer; or, the input output device 100 can be a separate remote cyber device which communicates with a remote computer through use of the cyber communications network 300

Communication between the input output device 100 and the individual's computer can use radio frequency, fiber optic, wire, or any other suitable method for communications known to those of ordinary skill in the art, or any combination thereof.

A remote thin input output device 100 provides an individual with the highest attainable level of functional utility and computing and communications mobility.

The input output device 100 can have the ability to interact with any cyber device that is capable of interacting with an input output device.

The input output device 100 may include one or more of the following sources for receiving input; a camera; a microphone; a keyboard; a pointing device; a touch or multi-touch display screen; a digital tablet; a sensor of any type; an input device of any type; a media reader; a stored information link; a global position locating device; interconnections for other input devices; and any other sources of input known to those of ordinary skill in the art.

The input output device 100 may include one or more of the following ways of providing output: an image display device; an audio output device; a tactile output device; interconnections for other output devices; or any other possible output known to those of ordinary skill in the art.

The size of the input output device's image display can range from the smallest usable image display size to the largest image display size available.

The input output device 100 may include a remote and/or a local connection for cyber interactions with an individual's computer.

Each input output device that is not an integral part of a computer has a unique single-point-of-access cyber system identification and a mobile or stationary single-point-of-access cyber system address.

Any individual can use any input output device for cyber interactions with the individual's remote computer. Input output devices need not be user-specific. Input output devices may also be cyber telephone devices.

Computers such as those incorporated into cell phones, laptop computers, or desktop computers can also be used as single-point-of-access cyber system input output devices. These types of input output devices also have the ability to provide the additional feature of computing functions to the individual.

The individual requires the use of the input output device 100 for cyber interactions with the individual's remote computer. The input output device 100 can be configured with two 8.5"×11" multi-touch, digital tablet-enabled image display screens which are hinged together like a book in portrait format as shown in FIG. 16B The illustrated input output device 901 shown in the array of images appearing in FIGS. 16A-16F makes an excellent, lightweight, and manageable cyber book, or an input output device which can be used to review cyber-based content of any kind. The input output device shown in the array of images in FIGS. 16A-16F is typically not a computer. Rather, the input output device shown in the array of images in FIGS. 16A-16F is typically a remote thin input output device which is used for cyber interactions with an individual's computer or for cyber interactions with other cyber devices.

As shown in FIGS. 16A and 16B, if the individual takes the input output device 901 which the individual is holding in book configuration and the individual places the input output device on a table where it is oriented as and can be used as an open laptop computer, then, through use of a cyber communications network interconnection with the individual's computer, this input output device may become a remote terminal for cyber interactions with the individual's computer.

An individual may use the multi-touch or the tablet functions of the image display screens on the illustrated input output device as keyboards or as a tablet for drawing, or for handwriting, or for marking of content.

Both of the image display screens on the illustrated input output device may also be arranged side-by-side to form one single larger sized image display screen.

With a 180-degree flip and a fold over of one of the image display screens of the input output device as shown in FIGS. 16D and 16E, the input output device can be transformed into a single-screen digital pad, or a digital tablet, or an interactive single screen image display as shown in FIG. 16F.

As shown in FIG. 16D, an input output device may include one or more cameras, microphones, or speakers to provide for multimedia functions and to provide the individual's computer with information which can be used to establish the individual's identity.

The previously described remote input output device may well be a commonly used mid-sized portable input output device. An input output device such as a thin iPhone-sized input output device puts interpersonal cyber communications as well as all of the capabilities of an individual's point of cyber access computer in the palm of the individual's hand.

Televisions, telephones, and other devices which provide audio/visual output can easily be adapted by a person of ordinary skill in the art for use as an input output device which can be used with the disclosed single-point-of-access cyber system.

The input output device 100 can be configured to provide additional functions beyond that of a basic input output device. These additional functions can be used to provide for the needs of a disabled individual, or for integration of the input output device into a special or single-purpose cyber system, or for any other purpose.

(10) Cyber Communications Network Between an Input Output Device and a Computer

The purpose of the part of the cyber communications network 300 which is used between the input output device 100 and the individual's computer is to safely and securely transfer properly formatted and properly identified transfer packets between the input output device 100 and the individual's computer.

There are unique transfer packet formats for:

(a) cyber interactions from an individual's computer to and through the cyber communications network 300 and to the individual who is using the input output device 100;

(b) cyber interactions from an individual using the input output device 100 to and through the cyber communications network 300 and to the individual's computer;

(c) cyber interactions from an individual's cyber assets to and through the input output device 100 which is being used by the individual to and through the cyber communications network 300 and to the individual's computer;

(d) cyber interactions from the cyber resources of others to and through the inpu t output device 100 which is being used by an individual to and through the cyber communications network 300 and to the individual's computer; and (e) cyber interactions from an individual's computer to and through the cyber communications network 300, to and through the input output device 100 which is being used by the individual, and to a cyber asset or to a cyber resource.

Cyber interactions between the input output device 100 and the individual's computer can use:

(a) multiple lines of cyber communications;

(b) multiple types of lines of cyber communications;

(c) multiple sources of lines of cyber communications.

Cyber interactions which use the part of the cyber communications network 300 between the input output device 100 and the individual's computer are to be protected from use by others by the use of encryption or other cyber security measures known to those of ordinary skill in the art which provide adequate security. Encryption may be used to render the content of a transfer packet useless to all but the sender and the recipient.

The part of the cyber communications network 300 between an input output device 100 that is being used by the individual and the individual's computer uses one or more of the following for the transfer of transfer packets: radio frequency; fiber optics; wire; any other suitable transfer method, or any combination thereof.

The cyber devices, cyber processes, and cyber procedures which serve the part of the cyber communications network 300 between the input output device 100 and the individual's computer provide for transfers of transfer packets which are free from intrusion and interference by others.

(11) Point of Cyber Access Computer

A point of cyber access computer 200 provides one specific individual with a safe and secure remotely accessible computer which provides this one individual with a single point to gain access to: computing capabilities; the individual's cyber assets; the individual's cyber telephone system; and cyber resources.

The individual's only portal for cyber access may be the individual's point of cyber access computer 200. The single-point-of-access cyber system 10 provides a system architecture in which each individual who uses the single-point-of-access cyber system 10 has a single point where the individual gains access to cyber activities, to cyber telephone communications, to cyber assets, and to available cyber resources. Further, all others have a single point of cyber access where the others can interact with this specific individual for cyber telephone communications and for cyber interactions.

As previously stated, the foundation for the single-point-of-access cyber system 10 is that:

each individual is properly identified prior to each step the individual's cyber interactions take through the single-point-of-access cyber system 10; and each cyber device is properly identified prior to each step the cyber device's cyber interactions take through the single-point-of-access cyber system 10.

An individual who desires to use the disclosed single point of access cyber system 10 may use the input output device 100 for remote cyber interactions with the individual's point of cyber access computer 200. The input output device 100 is used to provide the individual's point of cyber access computer 200 with information which allows the individual's point of cyber access computer 200 to establish the individual's identity.

After an individual's identity has been established by the individual's point of cyber access computer 200, the individual is granted access to the individual's point of cyber access computer 200. Further, after the individual's identity has been established by the individual's point of cyber access computer 200, the individual's point of cyber access computer 200 provides verification of the individual's identity prior to each step the individual's cyber interactions take through the single-point-of-access cyber system 10.

An individual's point of cyber access computer has the ability to establish the individual's identity and to provide verification of the individual's identity.

The point of cyber access computer 200 includes a separate private computer 230 and a separate public computer 260. Therefore, the point of cyber access computer 200 is a combination of at least three separate computers.

Each individual who uses the single-point-of-access cyber system 10 must be properly identified. An individual's point of cyber access computer 200 establishes the individual's identity. After the individual's identity has been established, the individual can gain access to the individual's private computer 230. Once the individual has gained access to the individual's private computer 230, the individual will have full operational access and administrative access to not only the individual's private computer 230, but also to the individual's point of cyber access computer 200 and to the individual's public computer 260 as well.

The device architecture of the point of cyber access computer solves many of the significant problems with prior art cyber systems and computers. An individual's point of cyber access computer includes three separate computers:

(a) the individual's point of cyber access computer;
(b) the individual's separate private computer; and
(c) the individual's separate public computer.

The individual's point of cyber access computer 200 provides security, access control, and internal routing for all of the individual's point of cyber access computer's cyber activities. The individual's point of cyber access computer 200 also provides interoperability processing and conversion as needed for inbound cyber activities, for outbound cyber activities, and for internal cyber activities.

Figure 11:
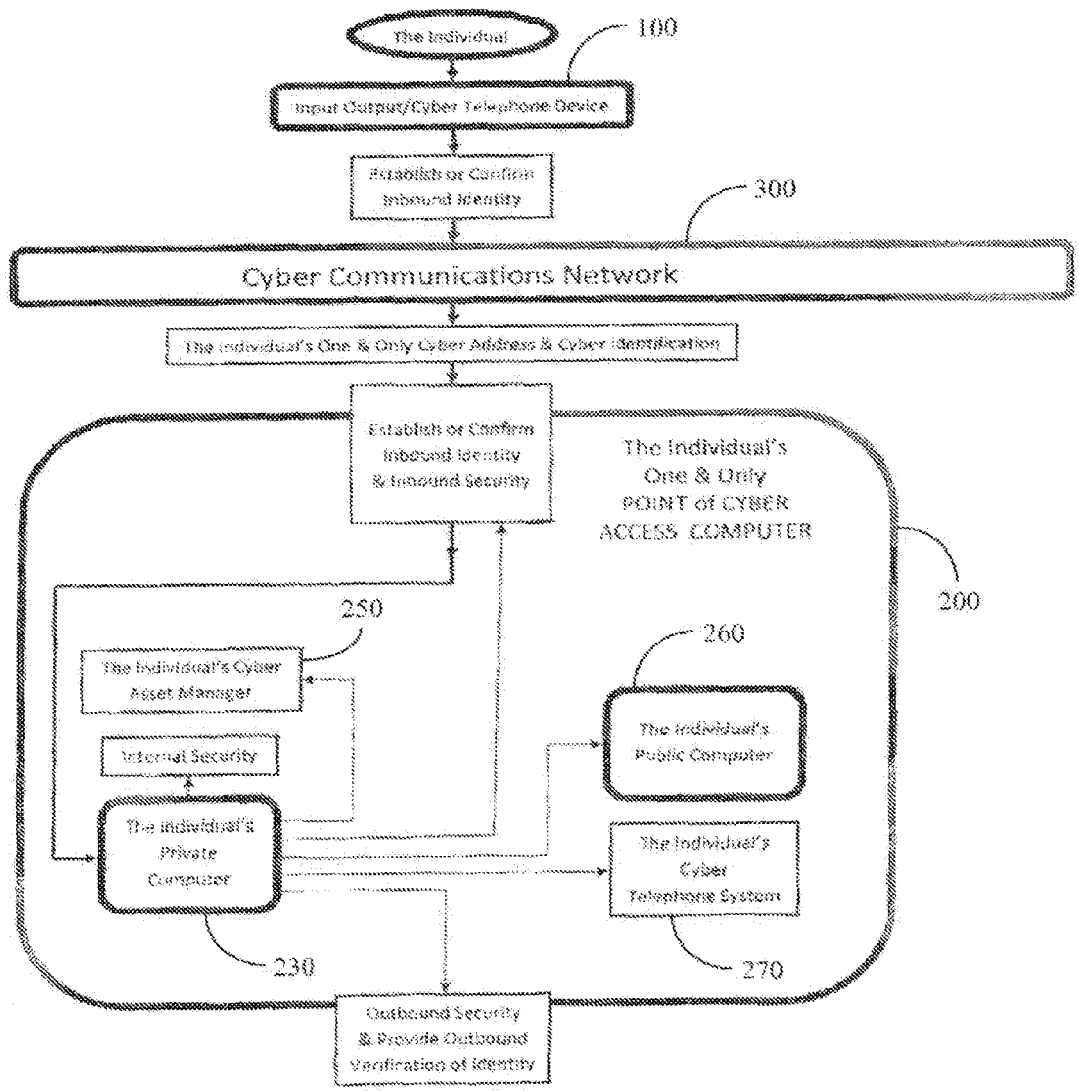
FIG. 11 is a schematic diagram which illustrates the individual's administrative-based, management-based, and operational cyber activities associated with the cyber assets.
Figure 12:
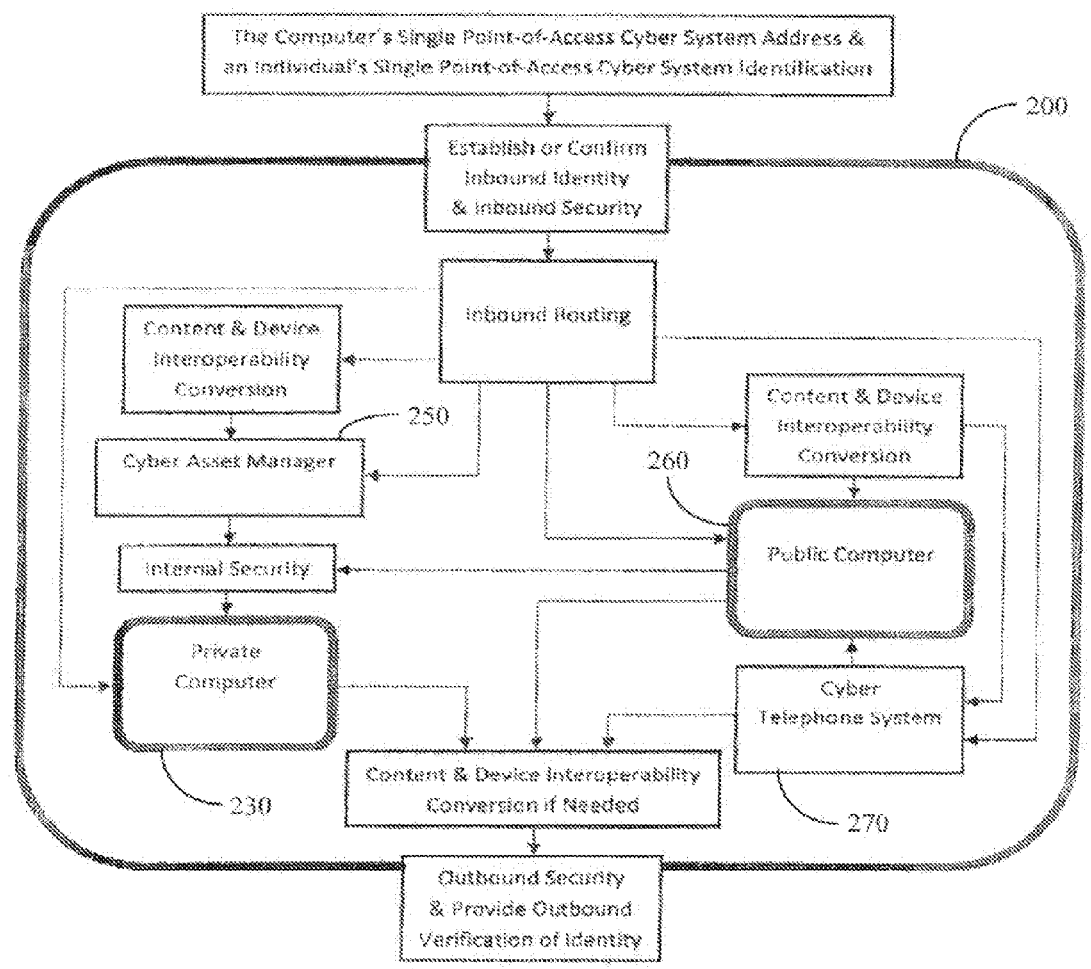
FIG. 12 is a schematic diagram which illustrates a point of cyber access computer as well as the components, interconnections, and the associated cyber activities within.

As shown in FIG. 11 an individual gains administrative control and operational control of the individual's point of cyber access computer 200 through the individual's private computer 230.

An individual has cyber interactions with the individual's private computer through the individual's use of the input output device 100. The individual's private computer 230 provides the individual with the ability to have cyber interactions with: the individual's point of cyber access computer 200; the individual's public computer 230; the individual's cyber telephone system 270; the individual's cyber assets; and available cyber resources. The individual's private computer 230 also provides the individual with the ability to have cyber interactions with others.

An individual's point of cyber access computer 200 must establish the individual's identity prior to providing the individual's cyber interactions access to the individual's point of cyber access computer 200. The individual's point of cyber access computer 200 must also establish the identity of the individual's device-based cyber assets prior to allowing the individual's device-based cyber assets' cyber interactions to gain access to the individual's point of cyber access computer 200.

Access to the individual's private computer 230 may only granted to cyber interactions from the individual and to cyber interactions from specific cyber assets of the individual. Cyber interactions from all others and the cyber devices of all others are excluded from gaining access to the individual's private computer.

An individual's public computer 260 is the only part of the individual's point of cyber access computer 200 where others can have cyber interactions with the individual or where others can gain access to the individual's cyber resources. The individual's cyber resources are only made available to others through the individual's public computer 260 and only with the permission of the individual.

An individual can choose to share all or any part of the individual's file-based cyber assets with specified others. The individual will make the individual's file-based cyber assets available to others by providing specified others with copies of the individual's cyber assets. These copies are placed in the individual's public computer and made available to specified others through the others' cyber interactions with the individual's public computer 260.

Cyber resources are an individual's file-based cyber assets which have been copied to the individual's public computer 260 for use by specified others.

It is an important security feature of the disclosed single-point-of-access cyber system that the single-point-of-access cyber system 10 requires the use of different and unique processes, procedures, formats, transfer packets, or codes for the operations of, and for cyber interactions with and between a point of cyber access computer 200 and the point of cyber access computer's private computer 230, and the point of cyber access computer's public computer 260.

The point of cyber access computer 200 pre-processes outbound cyber interactions to the input output device 100 so that the outbound cyber interactions can be transferred to and used by the input output device 100 with no further processing of content required.

The point of cyber access computer 200 provides an individual with the ability to provide others with the individual's requests or requirements for privacy as well as the individual's preferences or requirements for inbound cyber activities and for inbound cyber content.

The individual's point of cyber access computer 200 provides:

(a) one point where the individual gains identified access to the single-point-of-access cyber system 10;
(b) an individual with a point where others access the individual for cyber interactions;

(c) cyber security;

(d) an individual with cyber interactions with the cyber communications network 300;

(e) an individual with cyber interactions with the input output device 100 that is being used by the individual;

(f) an individual with cyber interactions using a cyber telephone device;

(g) routing of cyber activities;

(h) an individual with access to the individual's private computer 230;

(i) verification of the individual's identity at each step the individual's cyber interactions take through the single-point-of-access cyber system 10;

(j) an individual with the ability to send outbound cyber interactions to an input output device or to remote cyber devices;

(k) an individual with the ability to deny access to the individual's private computer 260 by cyber interactions from all others and the cyber devices of all others;

(l) cyber interaction and security between the individual's point of cyber access computer 200 and the individual's private computer 230;

(m) cyber interaction and security between the individual's point of cyber access computer 200 and the individual's public computer 260;

(n) cyber interaction and security between the individual's private computer 230 and the individual's public computer 260;

(o) processes and procedures which confirm the identity of each other prior to granting or denying the cyber interactions of each other access to the individual's point of cyber access computer 200;

(p) an individual with the ability to provide specified others access to the individual's public computer 260 for specified purposes;

(q) an individual with the ability to send outbound cyber interactions from the individual's public computer 260;

(r) verification of the individual's identity when the individual is sending outbound cyber interactions;

(s) verification of the individual's identity for the individual's interactions with the individual's device-based cyber assets;

(t) processes and procedures which establish the identity of the individual's device-based cyber assets prior to allowing cyber interactions from the individual's device-based cyber assets to gain access to the individual's point of cyber access computer 200;

(u) processes and procedures for device and file interoperability conversion to and from the single-point-of-access cyber system standard format; and (v) an individual with a cyber telephone system which provides cyber telephone and/or cyber video telephone services.

As shown in FIG. 13 the individual's private computer 230 provides an individual with all or any part of the following:

(a) a safe, secure, and private cyber environment where no others may gain access;

(b) computing capabilities;

(c) computer programs;

(d) computer applications;

(e) a history of cyber activities;

(f) storage, access, alteration, use, and management of the individual's file-based cyber assets which include but are not limited to the individual's personal information, the individual's health information, and the individual's financial information;

(g) a cyber asset manager;

(h) administrative control and operational control of the individual's device-based cyber assets including the individual's point of cyber access computer, the individual's private computer, the individual's public computer, the individual's cyber asset manager, and the individual's cyber telephone system;

(i) cyber interaction with others;

(j) cyber interactions with the cyber resources of others;

(k) the ability to specify others who have access to the individual's public computer;

(l) a system which allows the individual to share the individual's cyber assets with others by making copies of the individual's cyber assets available for specified others as a cyber resources;

(m) a system which provides the individual with the ability to specifically designate which cyber resources are available to each specific other through the individual's public computer;

(n) a system which allows the individual to grant or to deny specified others access to the individual's public computer 260; and (o) a system which allows the individual to grant or to deny specified others access to specific cyber resources of the individual.

As shown in FIG. 14 the individual's public computer 360 provides:

(a) a cyber portal where others interact with the individual;

(b) cyber security;

(c) the individual and others with computing;

(d) the individual and others with the use of computer programs;

(e) the individual and others with the use of computer applications;

(f) the individual with the ability to send outbound cyber interactions in response to requests from others;

(g) the individual and others with the individual's inbound cyber mail system;

(h) the individual and others with the individual's inbound cyber messaging system;

(i) specified others with the individual's cyber resources as specified by the individual;

(j) storage, access, alteration, use, and management of the individual's file-based cyber resources;

(k) the individual with the ability to grant or to deny specified others access to all or any part of the resources of the individuals public computer 260; and (l) the individual with the ability to grant or deny specified others access to all or any part of the individual's cyber resources.

(12) Cyber Telephone System

A cyber telephone system 270 (see FIG. 2) can be a component of a point of cyber access computer.

A cyber telephone system provides services for cyber telephone and/or cyber video telephone communications. The cyber telephone system can also send automated cyber telephone communications to others.

An individual may initiate outbound cyber telephone communications through the individual's use of the individual's private computer 230.

An individual has the ability to grant or to deny cyber telephone system access to the cyber telephone communication cyber interactions from others and from the cyber interactions of the cyber devices of others.

Transfer packet label information from an inbound cyber telephone communication interaction is used to determine if an individual grants or denies the inbound cyber telephone communication interaction access to the individual's cyber telephone system.

An individual may further grant or deny cyber telephone communication interactions from specified others access to all, or any part of the services of the individual's cyber telephone system.

An individual's cyber telephone system provides:

(a) cyber security;

(b) the individual with the ability to grant or deny access to all or any part of the services of the individual's cyber telephone system by cyber telephone communication interaction from others and from the cyber interactions of the cyber devices of others;

(c) for routing of inbound cyber telephone communication interactions or cyber alerts to a cyber telephone device at or near the person of the recipient;

(d) a message-taking system;

(e) for routing of cyber telephone communication interactions to the individual's cyber telephone system's message taking system;

(f) messages for the senders of an inbound cyber telephone communication interactions;

(g) the individual with the ability to re-direct inbound cyber telephone communication interactions to different recipients or different cyber devices; and (h) a history of cyber telephone system activities.

An individual using an input output device, after gaining access to the individual's private computer, has complete operational control, administrative control, and access control of the individual's cyber telephone system.

An individual has the ability to simultaneously interact with the individual's cyber telephone system, the individual's point of cyber access computer, the individual's private computer, the individual's personal computer, and the individual's device-based cyber assets.

The programming, processes, and procedures of the universal interactive operating system provide for complete security for cyber telephone communication interactions which are transferred from the individual's cyber telephone system to the individual's private computer or to the individual's public computer.

(13) Cyber Communications Network Between a Sender's Point of Cyber Access Computer and a Recipients Point of Cyber Access Computer The purpose of the part of the cyber communications network 300 which is used between a sender's point of cyber access computer and a recipient's point of cyber access computer is to safely and securely transfer properly formatted and properly identified transfer packets between a sender's point of cyber access computer and a recipient's point of cyber access computer.

A sender's cyber interaction which is to be directed to a recipient originates with the sender's interactions with an input output device. The cyber interaction from the sender's interactions with the input output device goes to and through the cyber communications network, to and through the sender's point of cyber access computer, to and through the cyber communications network 300, to and through the recipient's point of cyber access computer, and then to the public computer within the recipient's point of cyber access computer.

A sender's cyber interaction to a recipient can also come from the sender's public computer and go to and through the sender's point of cyber access computer, to and through the cyber communications network, to and through the recipient's point of cyber access computer, and then to the recipient's public computer.

A sender's cyber interaction to a recipient can also come from the sender's point of cyber access computer and go to and through the cyber communications network, to and through the recipient's point of cyber access computer, and then to the recipient's public computer.

There are many unique types of transfer packets for cyber interactions from the sender's point of cyber access computer to the recipient's point of cyber access computer. The different and unique types of transfer packets are used to identify different types of cyber activities in order to provide a high level of security for both the sender and the recipient.

Cyber interactions between a sender's point of cyber access computer and a recipient's point of cyber access computer can use one or more:

(a) lines of cyber communications;

(b) types of lines of cyber communications; and (c) sources of lines of cyber communications.

A sender is properly identified prior to each step the sender's cyber interactions take through the cyber communications network 300.

Cyber interactions which use the part of the cyber communications network 300 between a sender's point of cyber access computer 200 and a recipient's point of cyber access computer 200, most especially cyber interactions which use radio frequency, are protected from use by others by the use of encryption or other suitable cyber security measures known to those of ordinary skill in the art. Currently encryption may be used to render the content of the transfer packets useless to all but the sender and the recipient of the transfer packet.

The devices, processes, and procedures which serve the part of the cyber communications network that is used between a sender's point of cyber access computer and a recipient's point of cyber access computer provide for cyber communications network transfer of transfer packets which are free from intrusion or interference by others.

(14) an Individual's Cyber Asset Manager and the Individual's Device-Based Cyber Assets An individual's device-based cyber assets could include, but are not limited to one or more: video cameras; televisions; television programming access and selection devices; personal health monitors; personal health care devices; devices for identification of others; vehicles; cyber vaults; cyber file back-up and restore devices; global position locating devices; home or business automation management devices (which could monitor, record, and have cyber operational interactions with lights, heating and cooling systems, locks, garage door openers, lawn sprinkler systems, security systems, water meter readings, automated pet doors, personal weather stations, and more); or any other device-based cyber assets or systems.

An individual may have one or more device-based cyber assets which are not an integral part of the individual's computer.

An individual's remote device-based cyber assets have cyber interactions with the individual using one or more cyber asset managers.

An individual's cyber asset manager provides safe and secure cyber interactions between either the individual or the individual's cyber asset manager and the individual's device-based cyber assets. The individual's cyber asset manager also provides the individual with safe and secure administrative control and operational control of the individual's remote device-based cyber assets.

An individual may gain administrative control and operational control of the individual's cyber asset manager(s) through the individual's private computer 230. Utilizing this configuration, no others can gain administrative control or operational control of the individual's cyber asset manager (s).

There will be complete security for an individual's cyber interactions which are transferred from the individual's cyber asset manager to the individual's private computer.

An individual's computer establishes the identity of the individual's device-based cyber assets prior to providing cyber interactions from the individual's device-based cyber assets with access to the individual's cyber asset manager.

An individual's device-based cyber assets establish the identity of the individual's computer prior to the individual's device-based cyber assets' providing access to cyber interactions from the individual's computer, An individual's cyber asset manager(s) can be located within the individual's computer. This configuration of the location of the individual's cyber asset manager(s) can be used for interaction with the individual's remote device-based cyber assets which require low security cyber interactions.

An individual may have one or more cyber asset managers that are located within the individual's point of cyber access computer, or one or more additional cyber asset managers may be located within the individual's private computer. Locating a cyber asset manager within the individual's private computer would provide for the highest attainable level of security and privacy for cyber interactions with the individual's remote device-based cyber assets.

For example, an individual's cyber asset manager can have cyber interactions with a cyber device on the person of the individual. One particular cyber device that could be located on the person of the individual could monitor and report on the individual's blood sugar level. The individual may also have a cyber insulin delivery system which is operated through cyber interactions with the individual's cyber asset manager. The individual would need to rely on cyber interactions with both of these devices with the individual's life. Therefore, the individual would be best served by using the highest level of security and privacy available for cyber interactions with these two cyber devices. This can be accomplished by having cyber interactions with these remote device-based cyber assets provided by a private-computer-based cyber asset manager.

An individual's cyber asset manager and the same individual's remote device-based cyber assets interconnect using the resources of the cyber communications network.

An individual's cyber asset manager may use the universal interactive operating system for cyber operations and cyber interactions.

An individual's device-based cyber assets only interact with the individual. Others who wish to have cyber interactions with the individual's device-based cyber assets must request that the individual provide the requestor with the requested cyber resource(s). The requested cyber resource(s) may be made available for the requestor through the requestor's cyber interaction with the individual's public computer 260.

An individual's cyber asset manager and the individual's device-based cyber assets may each provides a history of cyber interactions and cyber activities.

(15) Cyber Communications Network Between an Individual's Cyber Asset Manager and the Individual's Remote Device-Based Cyber Assets The purpose of the part of the cyber communications network which is used between an individual's cyber asset manager and the individual's remote device-based cyber assets is to safely and securely transfer properly formatted and properly identified transfer packets between the individual's cyber asset manager and the individual's remote device-based cyber assets.

An individual's cyber asset manager's interaction with one of the individual's remote device-based cyber assets may come from the individual's cyber asset manager, through the individual's private computer, to and through the individual's point of cyber access computer, to and through the cyber communications network, to the individual's remote device-based cyber asset.

An individual's remote device-based cyber asset's interaction with the cyber asset manager comes from the individual's remote device-based cyber asset, to and through the cyber communications network, to and through the individual's point of cyber access computer, and either to the individual's cyber asset manager, or, to the individual's private computer, and then on to the individual's cyber asset manager.

There are many unique transfer packet formats for cyber interactions between an individual's cyber asset manager and the individual's remote device-based cyber assets. The different and unique transfer packet formats are used to identify cyber interactions between different types of cyber devices and to identify cyber interactions for different functions or purposes.

Cyber interactions between an individual's cyber asset manager and the individual's remote device-based cyber assets can use:

(a) one or more lines of cyber communications;

(b) one or more types of lines of cyber communications; and (c) one or more sources of lines of cyber communications.

An individual's device-based cyber assets can use a cyber telephone device which is being used by the individual, or an input output device which is being used by the individual as a cyber communications network link to or from the individual's computer.

An individual's cyber asset manager is required to be properly identified prior to each step that the individual's cyber asset manager's cyber interactions take through this part of the cyber communications network. Further, the individual's remote device-based cyber assets are required to be properly identified prior to each step the individual's remote device-based cyber assets' cyber interactions take through this part of the cyber communications network.

Cyber interactions which use the part of the cyber communications network between an individual's cyber asset manager and the individual's remote device-based cyber assets, most especially those cyber interactions that use radio frequency, are protected from use by others by the use of encryption or other suitable cyber security measures.

The devices, processes, and procedures which control the operations of this part of the cyber communications network through their use of the programming, processes, and procedures which are a part of the universal interactive operating system provide for the safe and secure transfer of transfer packets which are free from intrusion or interference by others.

(16) Examples of Use of the Single-Point-of-Access Cyber System

On election day in November every voter in the United States can, through use of an input output device, gain identified access to his or her point of cyber access computer. Through utilization of the single-point-of-access cyber system, every voter will have the ability to safely, securely, and privately cast his or her vote in any, or in all, of the elections where the individual is eligible to cast a vote.

As an example, in an elementary school classroom, a student can use an input output device such as shown in FIGS. 16A-16F which has two approximately 8" by 11" multi-touch image display screens which are hinged together on one side like a book in portrait format as shown in FIG. 16B. The student can turn the same input output device 90 degrees where it then resembles and may provide the functions of a laptop computer.

The student may utilize the input output device and the resources of a cyber communications network to interact with the student's remotely located computer.

As shown in FIGS. 16C and 16F, the student can use a stylus 907 in conjunction with the digital tablet feature of the input output device's display screens to write, to draw, or to interact with an image appearing on the display screen. The student can also use the multi-touch mode of the display screens for interaction with the student's computer. The student's display screen's multi-touch mode also provides the student with a touch screen keyboard. Further, the student can use the input output device's microphone or camera for input for cyber interaction with the student's computer. Also, the student may use any type of cyber input device which can interact with the student's input output device.

The student's computer provides the student with access to cyber educational materials from multiple sources such as a cyber library, or a cyber compendium of information, or the student's school district's cyber library.

The student's computer may use school district-supplied computer programs, school district-supplied computer applications, and school district-supplied cyber educational materials.

The student uses an input output device to remotely access the student's computer so that the student may use the school district-supplied cyber-based educational resources and materials for the class that the student is currently attending.

The input output device provides the student with full interactive access to all available cyber-based educational resources and materials.

The student can use a stylus 907 to either write a report or to work on math problems.

The student stores the student's schoolwork using the cyber resources of the student's computer.

The student submits finished school work to the student's teacher using the cyber mail functions of the single-point-of-access cyber system.

The student can also use the single-point-of-access cyber system for cyber telephone communication interactions with the student's teacher during class by simply using the single-point-of-access cyber system's cyber video telephone functions for remote interaction with the student's teacher from across the classroom.

The student's teacher, through use of school district-supplied computer programs and computer applications, can access a copy of the image which is displayed on the student's input output device. Using the same school district-supplied computer programs and computer applications, the student's teacher may interact with the student by providing graphic input which can be viewed by the student in real time on the image display screen of the student's input output device.

All of the previously addressed school-related cyber activities do not require that cyber interconnection infrastructure be provided to the student by the school district. Every cyber-based educational activity is performed using the single-point-of-access cyber system's cyber mail functions, cyber interaction functions, and cyber video telephone functions.

The school district can provide the student with any cyber educational materials which the school district deems appropriate.

The school district can also provide the student with cyber educational materials which are appropriate for the student's abilities in any field of study. Further, the school district can supply the student with cyber educational materials which are formatted to be of most interest to the student and most suitable to the learning style of the student. By using the educational resources of the single-point-of-access cyber system, a school district will have the ability to make "no child left behind" an educational concept and challenge of the past.

It should also be noted that the student can use any input output device to remotely access the cyber-based educational resources made available to the student through the student's computer from anywhere the student is located.

In the context of an individual's health care, when an individual has a health-related examination by a health care provider, the health care provider may safely, securely, and privately:

maintain a record of the interaction between the health care provider and the individual for the lifetime of the individual;

provide the single-point-of-access cyber system health care registry with the individual's single-point-of-access cyber system identification, along with the health care provider's single-point-of-access cyber system identification and the date of the health care-related service;

provide the individual with a complete record of the individual's health care-related interaction with the health care provider by sending a copy of the health care provider's record to the individual through the individual's computer.

The individual can review the copy of the health care provider's record for the Individual's health-related examination for accuracy and then require the health care provider to correct inaccuracies if needed.

The individual can choose to save all, or any part of, the health care provider's record of the individual's health-related examination by transferring the copy of the health care provider's record from the individual's public computer to the individual's private computer where the record or any part thereof can be saved as a part of the individual's absolutely safe, secure, and private files which contain the individual's personal health records.

The individual can also choose to delete the copy of the health care provider's record of the individual's health-related examination.

If the individual happens to lose, or deletes, the copy of the health care provider's record of the individual's health-related examination, the individual can contact the single-point-of-access cyber system health care registry and receive the needed information. The single-point-of-access cyber system health care registry provides information to the individual which only includes the health care provider's single-point-of-access cyber system identification and the date of the individual's health-related examination. Using information provided by the single-point-of-access cyber system health care registry, the individual can request that the health care provider send the individual a copy of the health care provider's record of the individual's prior health-related examination. The health care provider may then provide a copy of the record of the individual's health-related examination to the individual only, thereby providing the individual with complete privacy for single-point-of-access cyber system-based health records.

The individual can, anonymously, or with others' knowledge of the individual's identity, choose to share all or any part of the individual's health-related information with specified others.

If a third party such as a health care insurance company was obligated to pay for any part of the individual's health-related services, the third party insurance company can require that the individual provide the third party insurance company with a cyber interaction which discloses or confirms any or all of the details about the health-related services the individual received from the health care provider. This simple process eliminates the opportunity for health care fraud.

The individual can safely, securely, and privately share all or any part of the individual's health information with health care providers. The individual's shared health information will provide the health care provider with a tool to use to better provide appropriate health care services to the individual.

The individual can safely, securely, privately, and anonymously share all or any part of the individual's personal health information with scientists or researchers who are working to provide improved health care outcomes. Quantum leaps forward may be made by scientists and researchers when anonymously donated reliable health information from large numbers of individuals is made available for research.

The individual can also choose to provide the individual's health information to an agency such as the United States Center for Disease Control and Prevention (CDC) so that the CDC can use the individual as one of many who are used to monitor a geographic area or a specific part of the population for targeted health-related occurrences. The CDC can then monitor a sample of people to determine when and where there is an outbreak of flu or foodborne illness, and when and where there is an occurrence of any other targeted health-related issue.

The single-point-of-access cyber system's ability to allow an individual to safely, securely, privately, and anonymously share the individual's health information with others will provide public health entities with an informational tool which fills the public health entities state-of-the-public's-health informational need.

The single-point-of-access cyber system may provide an all-inclusive world-wide database of health care information as well as area-appropriate definitions for the health care information that is contained within the database. This database will be an ultimate informational tool for scientists and medical researchers to use to improve health care outcomes worldwide.

The single-point of access cyber system provides an individual with a safe, secure, and private process for cyber interactions with cyber health monitoring devices or cyber health care delivery devices which are on or near the person of the individual.

For example, an individual uses a cyber body function monitor on his or her person. The cyber body function monitor, using the resources of the single-point-of-access cyber system, interacts with the individual's computer. The individual's cyber body function monitor reports to the individual's point of cyber access computer that the individual has a blood sugar level which requires the individual's cyber insulin delivery system which is on the person of the individual to deliver a specified amount of insulin to the individuals bloodstream. The individual can require that the individual's permission is given prior to the delivery of insulin, or the individual can allow an automated delivery of insulin if the automated delivery does not exceed a pre-determined amount of insulin. The individual requires a dose of insulin which exceeds this pre-determined acceptable dose, so, the individual is required to approve the delivery of the indicated necessary dose of insulin before the indicated necessary dose of insulin is delivered.

The single-point-of-access cyber system's ability to safely, securely, and privately monitor and record information which is received from a cyber health monitoring device that is on or near the person of the individual provides an individual with intermittent or continuous reporting from cyber health-related monitors of any type. Information from cyber health-related monitors can be saved by the individual for use by the individual or for use by health care providers. Or, information from the individual's cyber health-related monitors can be used by science and medicine to enable science and medicine to better understand the intricacies of the workings of a human body in order to be able to provide improved health care outcomes worldwide.

In another example, an individual is driving towards the individual's residence. The individual inputs the voice command, "open the garage door," to the individual's pocket-sized input output/cyber telephone device. The individual's computer receives the individual's voice-based cyber interaction and in turn monitors the global position locating device which is a part of the individual's input output/cyber telephone device so that the individual's computer may determine the optimum point in time to interact with the individual's garage door opener. The individual's computer interacts with the individual's garage door opener to open the individual's garage door when the individual and the individual's vehicle approach.

While the disclosed system has been defined in terms of its preferred and alternative embodiments, those of ordinary skill in the art will understand that numerous other embodiments and applications of the disclosed system will become apparent. Such other embodiments and applications shall be included within the scope and meaning of the embodiment as defined by the appended claims.

What is claimed is:

1. A single-point-of-access cyber system, comprising:
   devices and programming for processing cyber activities;
   devices and programming structured to provide a single point of cyber access to an individual;
   one or more input output devices for providing either or both of local and remote cyber interactions between said individual and said devices and programming that are providing said individual with a single point of cyber access;
   devices and programming for providing proper identification of either or both of one or more individuals and one or more cyber devices, wherein the identity of each properly identified cyber device is established, verified and confirmed;
   devices and programming providing one or more cyber communications networks; and
   devices and programming for carrying out cyber activities among any properly identified entities selected from the group consisting of individuals, others, device-based cyber assets, and device-based cyber resources;

wherein said system has an architecture which defines both the components of the single-point-of-access cyber system and the interrelationship of said components, said architecture comprising (a) one or more operating systems providing programming for carrying out processes and procedures establishing and maintaining a cyber environment that provides for using and enforcing single-point-of-access cyber system architectural rules and requirements, (b) one or more operating systems providing operational programming for single-point-of-access cyber system devices and components, and (c) single-point-of-access cyber system architectural rules and requirements;

wherein said single-point-of-access cyber system structure includes (a) one or more point of cyber access computers, (b) one or more cyber devices constructed, arranged, and interconnected for cyber interactions with said one or more point of cyber access computers, and (c) a cyber communications network;

wherein said one or more input output devices provide for cyber interaction between said individual and said one or more point of cyber access computers;

wherein said one or more point of cyber access computers, said one or more input output devices, and said one or more cyber devices interconnect using said cyber communications network, all using said one or more operating systems;

wherein said one or more point of cyber access computers include said individual's point of cyber access computer, said individual's point of cyber access computer being a combination of the following three separate computers:
(a) said individual's point of cyber access computer which establishes or confirms the identity of the sender of each cyber interaction prior to providing said sender's cyber interaction further access to said individual's point of cyber access computer;
(b) said individual's private computer which can only be accessed through said individual's point of cyber access computer, and can only be accessed by cyber interactions from: said individual; and, said individual's device-based cyber assets; and,
(c) said individual's public computer which can be accessed by cyber interactions from others and can only be accessed through said individual's point of cyber access computer.

2. The single-point-of-access cyber system as defined in claim 1 further comprising one or more point of cyber access computers, said individual using a point of cyber access computer as a point to gain properly identified cyber access to any selected from the group consisting of cyber communications, cyber activities, said cyber assets, and said cyber resources.

3. The single-point-of-access cyber system as defined in claim 2, wherein either or both of: said single-point-of-access cyber system; and, said point of cyber access computer comprising devices and programming that establish said individual's identity prior to providing the cyber interactions of said individual with further access to said individual's point of cyber access computer.

4. The single-point-of-access cyber system as defined in claim 2, wherein said individual's point of cyber access computer further comprising devices and programming providing said individual with the ability to perform any from the list of: store; access; modify; use; and, manage either or both of: said individual's file-based cyber assets; and, said individual's file-based cyber resources.

5. The single-point-of-access cyber system as defined in claim 2, wherein said individual's point of cyber access computer further comprising:
devices and programming that confirm the identity of each other prior to allowing cyber interactions from said each other to gain further access to said individual's point of cyber access computer; and
devices and programming that establish or confirm the identity of each cyber device prior to allowing cyber interactions from said each cyber device to gain further access to said individual's point of cyber access computer.

6. The single-point-of-access cyber system as defined in claim 2, wherein said individual's point of cyber access computer further comprises devices and programming providing for cyber interactions between said individual's point of cyber access computer, and properly identified cyber devices.

7. The single-point-of-access cyber system as defined in claim 2, wherein after having established the identity of said individual, said individual's point of cyber access computer in turn provides verification of said individual's identity prior to each additional step said cyber interactions of said individual take throughout the single-point-of-access cyber system.

8. The single-point-of-access cyber system as defined in claim 2, said cyber communications network of said single-point-of-access cyber system including:
cyber communications network devices;
means for functionally interconnecting said cyber communications network devices; and
programming;
wherein prior to further cyber interactions between said cyber communications network and said individual's point of cyber access computer, said cyber communications network device that engages in first cyber interactions with said individual's point of cyber access computer to: confirm said individual's identity; and, establish the identity of said individual's point of cyber access computer.

9. The single-point-of-access cyber system as defined in claim 8 wherein after said cyber communications network device that engages in first cyber interactions with said individual's point of cyber access computer confirms said individual's identity and establishes the identity of said individual's point of cyber access computer, said device that engages in first cyber interactions then provides verification of identity of said individual's point of cyber access computer prior to each additional step cyber interactions of said individual take throughout the single-point-of-access cyber system.

10. The single-point-of-access cyber system as defined in claim 2, further comprising pre-processing of cyber content prior to said cyber content being sent to either or both of an input/output device and any other point of cyber access computer, said pre-processed cyber content being in a form requiring no further processing of said content for use by said input output device and said any other point of cyber access computer.

11. The single-point-of-access cyber system as defined in claim 1 wherein each said individual using said single-point-of-access cyber system has one and only one unique permanent single-point-of-access cyber system identification.

12. The single-point-of-access cyber system as defined in claim 1 wherein each said cyber device that is a part of said single-point-of-access cyber system has one and only one unique permanent single-point-of-access cyber system identification.

13. The single-point-of-access cyber system as defined in claim 1 further comprising any selected from the group consisting of:
   devices and programming for establishing the identity of either or both of: one or more said cyber devices; and, one or more said individuals using said single-point-of-access cyber system;
   devices and programming for verifying the identity of either or both of: one or more said cyber devices; and, one or more said individuals using said single-point-of-access cyber system; and
   devices and programming for confirming the identity of either or both of: one or more said cyber devices; and, one or more said individuals using said single-point-of-access cyber system.

14. The single-point-of-access cyber system as defined in claim 1 wherein:
   each said individual being properly identified immediately prior to each step the cyber interactions of each said individual take throughout the single-point-of-access cyber system; and
   each said cyber device being properly identified immediately prior to each step the cyber interactions of each said cyber device take throughout the single-point-of-access cyber system.

15. The single-point-of-access cyber system as defined in claim 1 further comprising devices and programming providing said individual with the ability to either or both of requesting and requiring that said others provide said individual with varying levels of privacy, said varying levels of privacy being specified by said individual.

16. The single-point-of-access cyber system as defined in claim 1 further comprising devices and programming providing for utilization of system-standard interface and interaction processes and procedures, said system-standard interface and interaction processes and procedures providing for interoperable use of any cyber device as a component of the single-point-of-access cyber system.

17. The single-point-of-access cyber system as defined in claim 1 further comprising system-standard processes and procedures that are utilized for minimizing the number of differing operational processes and procedures used by others by providing said system-standard operational processes and procedures for use by others.

18. The single-point-of-access cyber system as defined in claim 1 further comprising any from the group consisting of a cyber asset manager, a cyber telephone system and a cyber license system.

19. The single-point-of-access cyber system of claim 1, wherein said system has an architecture which defines both the components of the single-point-of-access cyber system and the interrelationship of said components, said architecture comprising:
   one or more operating systems providing programming for carrying out processes and procedures establishing and maintaining a cyber environment that provides for using and enforcing single-point-of-access cyber system architectural rules and requirements;
   one or more operating systems providing operational programming for single-point-of-access cyber system devices and components;
   single-point-of-access cyber system architectural rules and requirements;
   single-point-of-access cyber system structure including:
      one or more point of cyber access computers;
      one or more cyber devices constructed, arranged, and interconnected for cyber interactions with said one or more point of cyber access computers; and
      a cyber communications network;
   wherein said one or more input output devices provide for cyber interaction between said individual and said one or more point of cyber access computers; and
   wherein said one or more point of cyber access computers, said one or more input output devices, and said one or more cyber devices interconnect using said cyber communications network, all using said one or more operating systems.

20. The single-point-of-access cyber system of claim 19, wherein said single-point-of-access cyber system architectural rules including rules that (a) each individual be properly identified prior to each step cyber interactions of said individual take throughout the single-point-of-access cyber system; and (b) each cyber device be properly identified prior to each step of any cyber interactions said cyber device takes throughout the single-point-of-access cyber system.

21. The single-point-of-access cyber system of claim 19, further comprising at least one element selected from the group consisting of a cyber asset manager, and a cyber telephone system.

22. The single-point-of-access cyber system of claim 19, further comprising programming providing system-standard interface and interaction processes and procedures, wherein said one or more cyber devices can be configured to be used as a part of the single-point-of-access cyber system by means of said one or more cyber devices' use of said system-standard interface and interaction processes and procedures.

23. The single-point-of-access cyber system of claim 19, wherein either or both of processes and procedures can be any selected from the group consisting of:
   added to said single-point-of-access cyber system;
   removed from said single-point-of-access cyber system; and,
   arranged in any configuration as a part of said single-point-of-access cyber system.

24. The single-point-of-access cyber system of claim 19, wherein at least one of architectural components and devices is selected from the group consisting of
   added to said single-point-of-access cyber system;
   removed from said single-point-of-access cyber system; and
   arranged in any configuration as a part of said single-point-of-access cyber system.

25. The single-point-of-access cyber system of claim 19, further comprising a single-point-of-access cyber system device architecture wherein any item selected from the group consisting of components, processes and procedures can be any item selected from the group consisting of (a) added to a cyber device, (b) removed from a cyber device, and (c) arranged in any configuration as part of a cyber device.

26. The single-point-of-access cyber system of claim 19, further comprising:
   a single interconnected cyber system for use by said individual for any purpose selected from the group consisting of said individual's cyber communications; said individual's cyber interactions; and said individual's cyber activities;

a system-wide set of standard processes and procedures providing for and requiring compliance with single point of access cyber system architectural rules and requirements;

a requirement that each cyber device and each individual using said single-point-of-access cyber system always be properly identified;

either or both of a locally accessible or a remotely accessible point of cyber access computer for said individual's use for single-point-of-access cyber system cyber communications, cyber interactions, and cyber activities; and programming and devices providing said individual with remote access to said cyber assets and said cyber resources.

27. The single-point-of-access cyber system of claim 19, further comprising at least one element selected from the group consisting of:
  (a) a single interconnected cyber system for use by said individual for any purpose selected from the group consisting of (i) said individual's cyber communications (ii) said individual's cyber interactions, and (iii) said individual's cyber activities,
  (b) a system-wide set of standard processes and procedures providing for and requiring compliance with single point of access cyber system architectural rules and requirements,
  (c) a requirement that each cyber device and each individual using said single-point-of-access cyber system always be properly identified,
  (d) either or both of a locally accessible or a remotely accessible point of cyber access computer for said individual's use for single-point-of-access cyber system cyber communications, cyber interactions, and cyber activities, and
  (e) programming and devices providing said individual with remote access to said cyber assets and said cyber resources.

28. The single-point-of-access cyber system of claim 1, further comprising devices and programming providing:
  separate processing and support for said individual's private cyber activities; and
  separate and different processing and support for said individual's public cyber activities.

29. The single-point-of-access cyber system of claim 1, wherein said individual's point of cyber access computer comprises devices and programming providing a single source of processing and support for one or more selected from the group consisting of security; interoperability; determining proper identity; access control; said individual's private cyber activities and resources; and said individual's public cyber activities and resources.

30. The single-point-of-access cyber system of claim 1, wherein each step of a cyber interaction taken by an individual on the system includes (a) properly identifying the individual, and (b) performing the step of the cyber interaction.

31. The single-point-of-access cyber system of claim 1, wherein said devices and programming structured to provide a single point of cyber access to an individual provide safe, secure access to any computing capabilities, any cyber assets, any cyber communications, and any available cyber resources.

* * * * *